(12) United States Patent
Endo et al.

(10) Patent No.: US 8,641,979 B2
(45) Date of Patent: Feb. 4, 2014

(54) REACTION DEVICE AND ELECTRONIC EQUIPMENT

(75) Inventors: Motoki Endo, Fussa (JP); Tsutomu Terazaki, Fussa (JP); Tetsushi Ishikawa, Akishima (JP); Osamu Nakamura, Kodaira (JP); Masaharu Shioya, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 1034 days.

(21) Appl. No.: 12/333,486

(22) Filed: Dec. 12, 2008

(65) Prior Publication Data

US 2009/0155646 A1 Jun. 18, 2009

(30) Foreign Application Priority Data

Dec. 17, 2007 (JP) ................................ 2007-324645

(51) Int. Cl.
  *F28D 21/00* (2006.01)
(52) U.S. Cl.
  USPC ............................ 422/202; 422/198; 429/479
(58) Field of Classification Search
  USPC ................... 422/198, 202; 429/479, 465, 491
  See application file for complete search history.

(56) References Cited

U.S. PATENT DOCUMENTS

| 7,622,208 | B2 | 11/2009 | Nakamura |
| 2002/0081471 | A1 | 6/2002 | Keegan et al. |
| 2002/0106540 | A1 | 8/2002 | Shioya |
| 2003/0054215 | A1 * | 3/2003 | Doshi et al. ..................... 429/26 |
| 2004/0043263 | A1 | 3/2004 | Takeyama et al. |
| 2006/0127729 | A1 | 6/2006 | Roscoe et al. |
| 2007/0151151 | A1 | 7/2007 | Nakamura et al. |
| 2007/0295734 | A1 | 12/2007 | Nakajima et al. |
| 2009/0202875 | A1 | 8/2009 | Nakamura |
| 2009/0246576 | A1 | 10/2009 | Terazaki et al. |
| 2010/0062298 | A1 | 3/2010 | Valensa |

FOREIGN PATENT DOCUMENTS

| CN | 1992411 A | 7/2007 |
| EP | 1 416 551 A2 | 5/2004 |
| GB | 2 436 396 A | 9/2007 |
| JP | 10-155667 A | 6/1998 |
| JP | 2004-303695 A | 10/2004 |
| JP | 2005-225686 A | 8/2005 |
| JP | 2006-156011 A | 6/2006 |
| JP | 2007-70184 A | 3/2007 |
| JP | 2007-179927 A | 7/2007 |
| JP | 2008-001579 A | 1/2008 |
| WO | WO 2006/057158 A1 | 6/2006 |
| WO | WO 2008/095076 A1 | 8/2008 |

OTHER PUBLICATIONS

Chinese Office Action dated Dec. 10, 2010 (and English translation thereof) in counterpart Chinese Application No. 200810185902.1.

(Continued)

*Primary Examiner* — Natalia Levkovich
(74) *Attorney, Agent, or Firm* — Holtz, Holtz, Goodman & Chick, PC

(57) ABSTRACT

Disclosed is a reaction device including: a reactor to cause a reaction of a reactant; a first container to house the reactor; and a second container to house the first container, wherein a gas is injected to a space between the reactor and the first container and the first container is sealed, and an atmospheric pressure in a space between the first container and the second container is lower than a normal atmospheric pressure.

2 Claims, 16 Drawing Sheets

(56) References Cited

OTHER PUBLICATIONS

Extended European Search Report dated Apr. 6, 2009, 6 pages, issued in counterpart European Application No. EP 08021404.2-2119.

Japanese Office Action dated Oct. 20, 2009 and English translation thereof issued in counterpart Japanese Application No. JP 2007-324645.

Taiwanese Office Action dated May 17, 2012 (and English translation thereof) in counterpart Taiwanese Application No. 097148689.

U.S. Appl. No. 12/410,626, filed Mar. 25, 2009; First Named Inventor: Tsutomu Terazaki; Title: "Reaction Device and Electronic Equipment".

U.S. Office Action dated Aug. 3, 2011 issued in related U.S. Appl. No. 12/410,626.

U.S. Office Action dated Jan. 12, 2012 issued in related U.S. Appl. No. 12/410,626.

\* cited by examiner

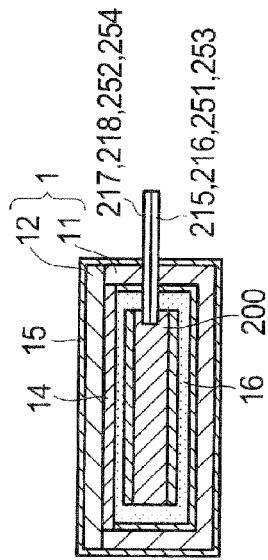
FIG. 4A
FIG. 4B
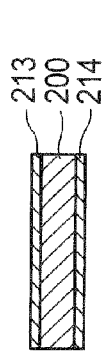
FIG. 4C
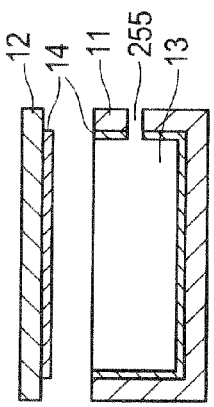
FIG. 4D
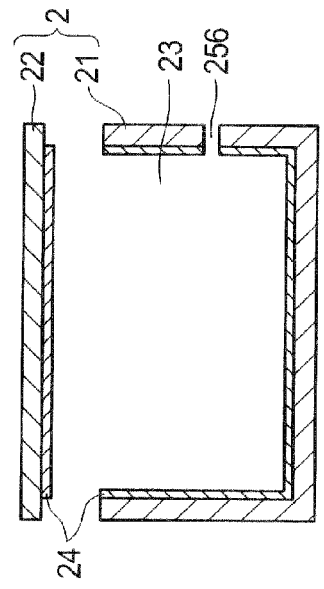
FIG. 4E
FIG. 4F
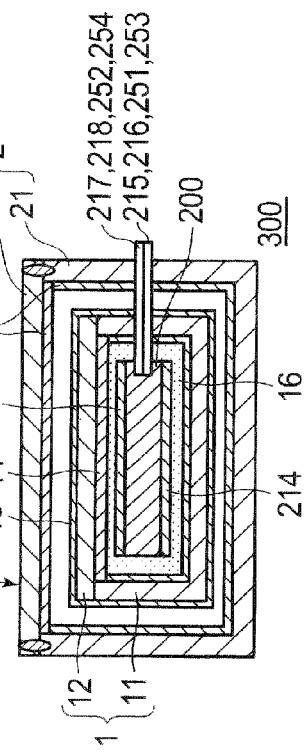
FIG. 4G
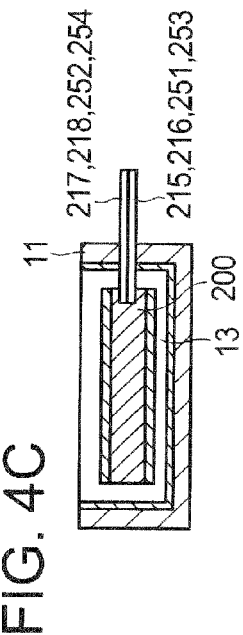
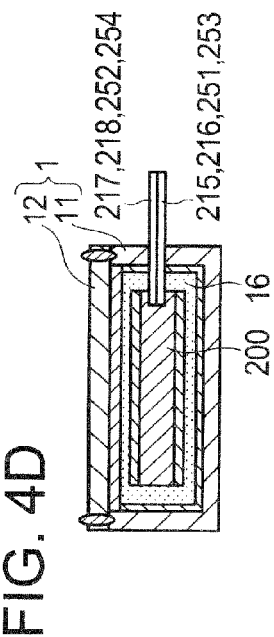

REACTION DEVICE AND ELECTRONIC EQUIPMENT

CROSS-REFERENCE TO RELATED APPLICATIONS

This application is based upon and claims the benefit of priority under 35 USC 119 of Japanese Patent Application No. 2007-324645 filed on Dec. 17, 2007, the entire disclosure of which, including the description, claims, drawings, and abstract, is incorporated herein by reference in its entirety.

BACKGROUND OF THE INVENTION

1. Field of the Invention

The present invention relates to a reaction device and electronic equipment which house a reactor to cause a reaction of a reactant.

2. Description of Related Art

In a technical field of a chemical reaction, there is known a chemical reaction apparatus to generate desired reactive material by causing a chemical reaction with a catalyst put inside a flow path which is temperature-managed by an electric heater, and an electric power generator to generate electric power by causing above chemical reaction. Such chemical reaction apparatus includes, for example, a reformer to produce a gas composed mostly of hydrogen from organic compound including a hydrogen atom, and a fuel cell to generate electric power from hydrogen and oxygen.

Here, a heat quantity necessary for continuing the desired chemical reaction is supplied by heat generation with electric power supply to a resistance heating element, combustion heat of a catalyst combustion reaction, and so on. In order to reduce heat dissipation from a reaction area to an ambient environment, for example, Japanese Patent Application Laid-Open Publication No. 2006-156011 discloses a method includes: housing the reformer as a high temperature area in an inner shell of a container; further housing the inner shell in an outer shell of the container; and maintaining a pressure in a spacer layer arranged between the inner shell and the outer shell lower than a normal atmospheric pressure (1 atm).

The above-described chemical reaction apparatus has been investigated for accelerating a temperature rise to shorten a starting time of the apparatus. For this purpose, it is conceivable to reduce a pressure around the reaction area, for example, so that the pressure equals to or is less than 10 Pa to insulate the reaction area to which the heat quantity is supplied. In this case, a stress caused by a pressure difference between a pressure of a reaction gas outside a wall which defines the above-described reaction area and the decreased pressure surrounding the reaction area increases. Moreover, accelerating a temperature rise makes it easier to cause a temperature distribution in the wall which defines the reaction area so that the stress caused by a heat strain increases.

Since the stress added to the wall increases when a temperature rise is accelerated, there is a limit on accelerating a temperature rise when a wall thickness is uniform. On the other hand, if the wall thickness is reduced, a heat capacity of the reaction area can be reduced so that a temperature rise can be further accelerated. However, as described above, there is a limit on reducing the wall thickness because the stress added to the wall increases when a temperature rises.

SUMMARY OF THE INVENTION

A reaction device according to the present invention includes: a reactor to cause a reaction of a reactant; a first container to house the reactor; and a second container to house the first container, wherein a gas is injected to a space between the reactor and the first container and the first container is sealed, and an atmospheric pressure in a space between the first container and the second container is lower than a normal atmospheric pressure.

Moreover, a reaction device according to the present invention includes: a reactor to cause a reaction of a reactant; a first container to house the reactor; and a second container to house the first container, wherein the reactor includes a flow path through which the reactant flows, the flow path of the reactor is communicated with a space between the reactor and the first container, and an atmospheric pressure in a space between the first container and the second container is lower than a normal atmospheric pressure.

Electronic equipment according to the present invention includes: a reactor to cause a reaction of a reactant; a first container to house the reactor; and a second container to house the first container, wherein a gas is injected to a space between the reactor and the first container and the first container is sealed, an atmospheric pressure in a space between the first container and the second container is lower than a normal atmospheric pressure, the reactor is a fuel cell which generates electric power by an electrochemical reaction of a fuel and oxygen, and the electronic equipment includes an electronic equipment body to operate using electric power generated by the fuel cell.

Moreover, electronic equipment according to the present invention includes: a reactor to cause a reaction of a reactant; a first container to house the reactor; and a second container to house the first container, wherein the reactor includes a flow path through which the reactant flows, the flow path of the reactor is communicated with a space between the reactor and the first container, an atmospheric pressure in a space between the first container and the second container is lower than a normal atmospheric pressure, the reactor is a fuel cell which generates electric power by an electrochemical reaction of a fuel and oxygen, and the electronic equipment includes an electronic equipment body to operate using electric power generated by the fuel cell.

BRIEF DESCRIPTION OF THE DRAWINGS

The present invention will sufficiently be understood by the following detailed description and accompanying drawing, but they are provided for illustration only, and not for limiting the scope of the invention.

FIG. 1 is cut along a cutting plane line II(a)-II(a), FIG. 1 is cut along a cutting plane line II(b)-II(b), FIGS. 4A-4G are views showing a process of housing the fuel cell 200 in the heat insulating container 100, FIG. 9 is cut along a cutting plane line X(a)-X(a), FIG. 9 is cut along a cutting plane line X(b)-X(b)

DETAILED DESCRIPTION OF THE PREFERRED EMBODIMENTS

In the following, the best modes for implementing the present invention will be described with reference to the drawings. Although technically preferable various limitations for implementing the present invention are given to the embodiments described below, the limitations are not intended to limit the scope of the present invention to the following embodiments and shown examples.

First Embodiment

Figure 1:
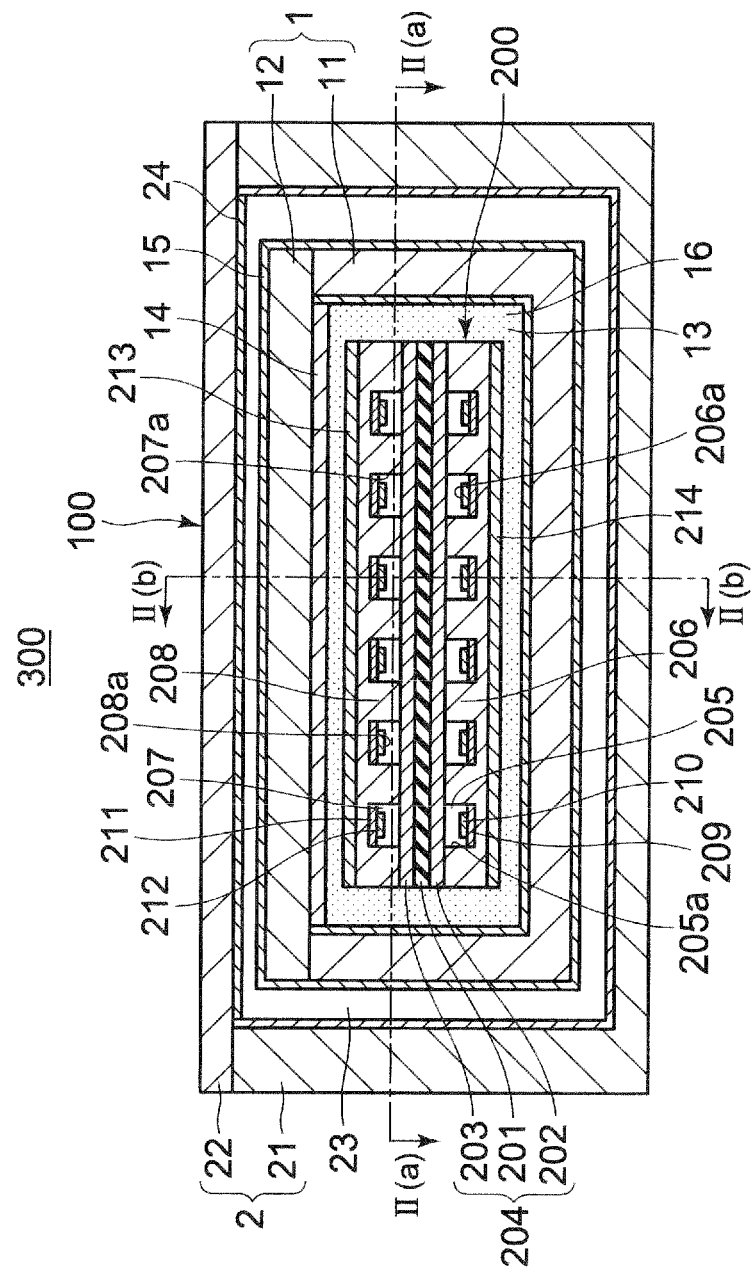
FIG. 1 is a longitudinal sectional view showing a internal structure of a reaction device 300 where a fuel cell 200 is housed in an heat insulating container 100.
Figure 2A:
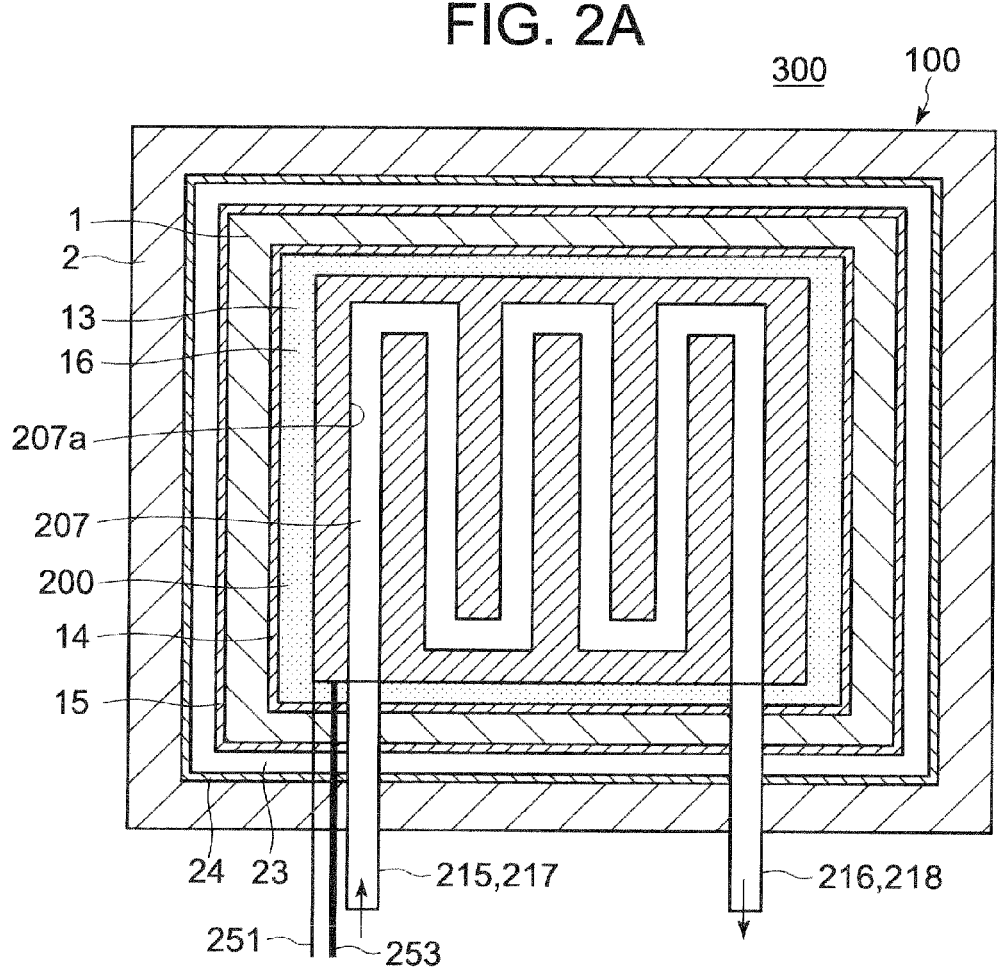
FIG. 2A is a fragmentary view when
Figure 2B:
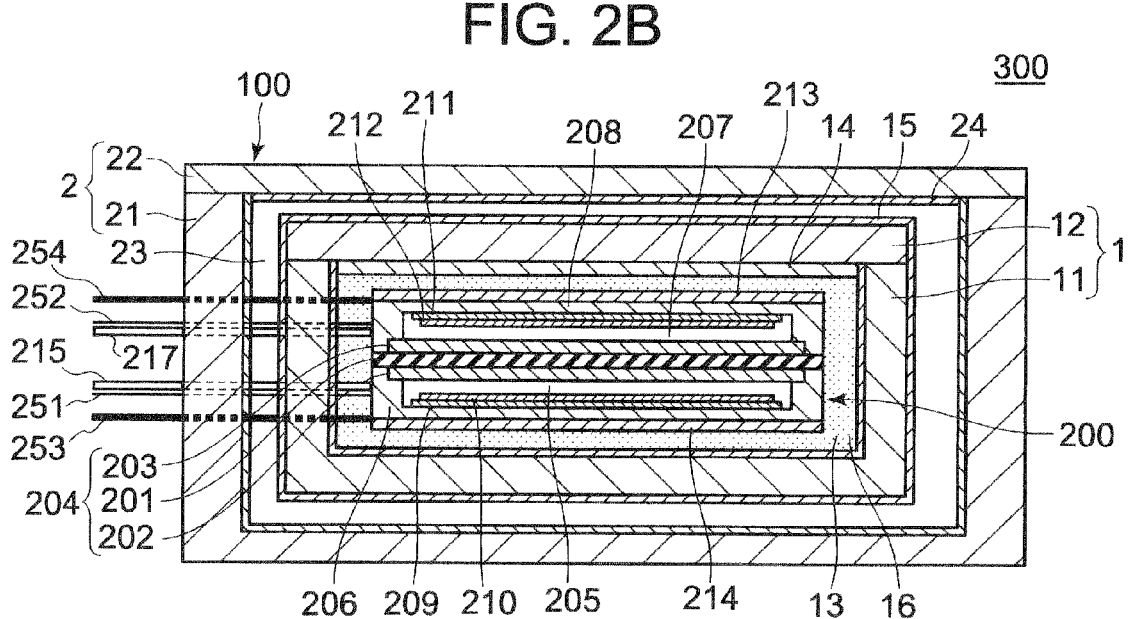
FIG. 2B is a fragmentary view when

FIG. 1 is a longitudinal sectional view showing a internal structure of a reaction device 300 where a fuel cell (reactor) 200 is housed in an heat insulating container 100, FIG. 2A is a fragmentary view when FIG. 1 is cut along a cutting plane line II(a)-II(a), and FIG. 2B is a fragmentary view when FIG. 1 is cut along a cutting plane line II(b)-II(b).

The reaction device 300 includes the heat insulating container 100, and the fuel cell 200 housed in the heat insulating container 100.

The fuel cell 200 is a solid oxide type fuel cell. The fuel cell 200 is equipped with a single cell 204 where a fuel electrode 202 (anode) and an oxygen electrode 203 (cathode) are severally formed on both surfaces of a solid oxide electrolyte 201, a fuel electrode separator 206 where a fuel feeding flow path 205 to supply a reformed gas to the fuel electrode 202 is formed, and an oxygen electrode separator 208 where an oxygen feeding flow path 207 to supply oxygen to the oxygen electrode 203 is formed, are stacked, and a sealing medium (not shown) seals a periphery so as to keep airtightness in each of the flow paths 205, 207.

An insulating film 209 is formed inside the fuel feeding flow path 205, and a thin film heater/temperature sensor 210 is formed on a surface of the insulating film 209. Also inside the oxygen feeding flow path 207, an insulating film 211 is formed, and a thin film heater/temperature sensor 212 is formed on a surface of the insulating film 211.

The thin film heaters/temperature sensors 210, 212 heat the fuel cell 200 up to a range of 600-800° C. which is an operation temperature of the fuel cell 200. The insulating films 209, 211 electrically isolate each of the separators 206, 208 from the thin film heaters/temperature sensors 210, 212, for example, using $SiO_2$ and the like. As the thin film heaters/temperature sensors 210, 212, Au, Pt, W and the like may be used. Moreover, electrodes for thin film heaters 251, 252 to supply electric power from without are connected to the thin film heaters/temperature sensors 210, 212.

As the solid oxide electrolyte 201, $(Zr_{1-x}Y_x)O_{2-x/2}$ (YSZ) of ziconia system, $(La_{1-x}Sr_x)(Ga_{1-y-z}Mg_yCo_z)O_3$ of lanthanum gallate system, an electrolyte of ceria system, and the like may be used. As the fuel electrode 202, $La_{0.84}Sr_{0.16}MnO_3$, $La(Ni, Bi)O_3$, $(La, Sr)MnO_3$, $In_2O_3+SnO_2$, $LaCoO_3$, and the like may be used. As the oxygen electrode 203, Ni, Ni+YSZ, and the like may be used. As the fuel electrode separator 206 and the oxygen electrode separator 208, $LaCr(Mg)O_3$ of lanthanum chromite system, $(La, Sr)CrO_3$ and the like, $NiAl+Al_2O_3$ and the like of nickel system alloys, ferrite system alloy, chromium system alloy, titanate system and the like may be used respectively. Above component material are formed so as to be thin in order to reduce a heat capacity of the solid oxide type fuel cell 200 and to uniformize a temperature of a reaction area. Incidentally, in FIG. 1, the single cell is shown as an example, but a multilayer cell can be formed by laminating a plurality of the configurations.

Low radiation rate layers 213, 214 radiation rates of which are lower than that of an outer wall surface of a first container 1, are formed on a top surface and a lowermost surface of the fuel cell 200 respectively, in order to prevent a heat quantity from dissipating from the fuel cell 200 due to radiation. As the low radiation rate layers 213, 214, a metal film a radiation rate of which is as small as several percent in an infrared region is preferably used. For example, Au, Cu, Rh, Pt, and the like may be used. Especially, Au is most suitable for the low radiation rate layers 213, 214 because a radiation rate of Au is as well as about 2% in an infrared region, which is very small among metals. Moreover, in order to improve adhesion strength of this infrared reflective film, an adhesion layer (not shown) may be formed between a surface of a film to be formed and the infrared reflective film. As the adhesion layer, W, Mo, Ta, and the like may be used, for example.

Incidentally, the metal films formed as the low radiation rate layers 213, 214 may be formed in at least parts of whole surfaces of the top surface and the lowermost surface of the fuel cell 200. Moreover, as the low radiation rate layers 213, 214, a mirror-like finishing may also be used instead of the metal film to reduce the radiation rate.

Moreover, a fuel feeding tube 215 which is connected to a reformer (not shown) and to which the reformed gas (hydrogen) generated in the reformer is supplied, and a fuel discharging tube 216 to discharge an unreacted reformed gas (hydrogen) which was not used for electric power generation are connected to the fuel feeding flow path 205. Furthermore, an oxygen feeding tube 217 to supply oxygen and an oxygen discharging tube 218 to discharge unreacted oxygen which was not used for electric power generation are connected to the oxygen feeding flow path 207.

The fuel feeding tube 215, the fuel discharging tube 216, the oxygen feeding tube 217 and the oxygen discharging tube 218 penetrate the first container 1 and a second container 2, which are described later, so as to project outward.

Air is supplied to the oxygen electrode 203 of the fuel cell 200 configured as described above through the oxygen feeding flow path 207. In the oxygen electrode 203, an oxygen ion is produced from oxygen in the air and an electron supplied from a cathode output electrode 254 as shown in the following formula (1).

$$O_2+4e^-\rightarrow 2O^{2-} \quad (1)$$

The reformed gas sent from the reformer is sent to the fuel electrode 202 through the fuel feeding flow path 205. In oxygen electrode 207, reactions of an oxygen ion passed through the solid oxide electrolyte 201 and the reformed gas occur as shown in the following formulas (2), (3).

$$H_2+O^{2-}\rightarrow H_2O+2e^{2-} \quad (2)$$

$$CO+O^{2-}\rightarrow CO_2+2e^{2-} \quad (3)$$

Thus, since an operation temperature of the solid oxide type fuel cell 200 is as high as 600-800° C., also carbon monoxide may be used as a fuel, so that electric power generation efficiency is improved. Incidentally, produced electron is supplied from an anode output electrode 253 through an external circuit and the cathode output electrode 254 to the oxygen electrode 203.

The reformed gas (offgas) which has passed through the fuel feeding flow path 205 is discharged outward.

The heat insulating container 100 includes the first container 1 to house the fuel cell 200 and the second container 2 to house the first container 1. The first container 1 includes a container body 11 having a shape of a box which opens at an upper surface and a lid section 12 to cover an opening of the container body 11. By covering the opening of the container body 11 with the lid section 12, a space 13 for housing the fuel cell 200 is formed inside the container body 11. The second container 2 also includes a container body 21 having a shape of a box which opens at an upper surface and a lid section 22 to cover an opening of the container body 21, By covering the opening of the container body 21 with the lid section 22, a space 23 for housing the first container 1 is formed inside the container body 21. The first container 1 and the second container 2 are composed of a metal plate such as stainless (SUS304, SUS316, SUS316L) and kovar alloy, a glass substrate, and ceramics.

On an inner wall surface (an inner wall surface of the container body 11 and a lower surface of the lid section 12) of the first container 1, a low radiation rate layer 14 is formed in order to reduce radiation heat transmission from the fuel cell 200. The low radiation rate layer 14 has same configuration and is composed of same material as those of the above-described low radiation rate layers 213, 214.

Moreover, also on the outer wall surface of the first container 1 and an inner wall surface of the second container 2, low radiation rate layers 15, 24 are formed in order to reduce radiation heat transmission from the fuel cell 200. The low radiation rate layers 15, 24 have same configurations as the above-described low radiation rate layers 213, 214, and as material, Al and Ag may be used in addition to the above-described material.

Furthermore, the low radiation rate layers 14, 15, 24 may be formed in at least parts of the inner and outer wall surfaces of the first container 1 and the inner wall surface of the second container 2. A mirror-like finishing may also be used instead of the metal film to reduce the radiation rate.

A gas 16 is injected in the space 13 of the first container 1, and the first container 1 is sealed off. The gas 16 is preferably rare gas having a larger molecular mass than that of an air, more preferably xenon especially. A pressure of the gas 16 is adjusted so as to allow a stress occurring in wall surfaces 205a, 206a, 207a and 208a which form each of the flow path 205, 207 to equal to or be less than a fracture stress, which stress is caused by a difference between a pressure of fluid flowing through the fuel feeding flow path 205 and the oxygen feeding flow path 207 in the fuel cell 200, and a pressure of the gas 16 injected to the space 13 of the first container 1.

Figure 3:
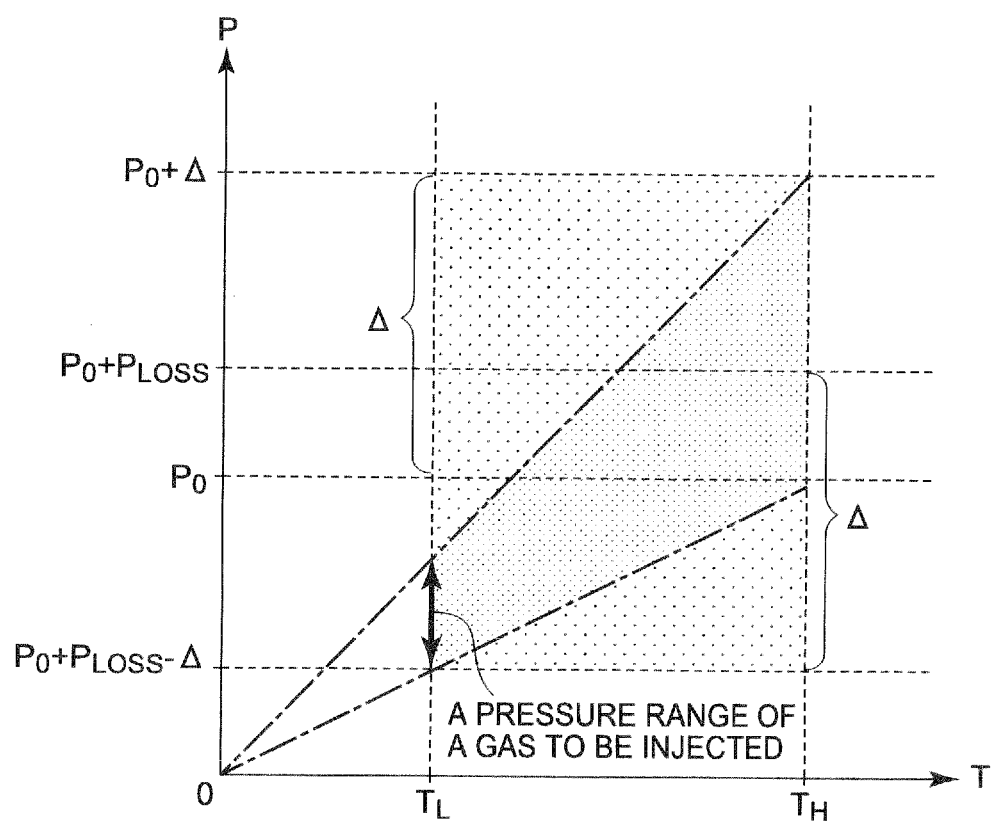
FIG. 3 is a graph showing a pressure range of a gas to be injected into a space 13 of a first container 1.

Specifically, for explaining with FIG. 3, it is now assumed that a fracture limit pressure difference (fracture stress) of the flow path is $\Delta$ (atm). It is also assumed that a pressure at a flow path exit is $P_0$, and a pressure difference between a pressure at the flow path entry and the pressure at the flow path exit, namely a pressure loss of the flow path is $P_{LOSS}$ (atm) A pressure to an inner wall surface of the flow path is distributed between $P_0$ and $P_0+P_{LOSS}$. Moreover, it is assumed that the operation temperature of the fuel cell is $T_H(K)$, a room temperature is $T_L(K)$, and a ratio $T_L/T_H$ of these temperatures is $\alpha(<1)$. When the first container is filled with the gas having a pressure P at the temperature $T_L$, a pressure of the gas inside the first container changes from P to $(1/\alpha)P$ between the temperatures of $T_L$ and $T_H$. In FIG. 3, a change of the pressure P with the temperature is shown with a dashed line. For keeping a differential pressure between inside and outside of the flow path within the fracture limitation, the change of the pressure P with the temperature needs to be within a shaded region in the temperature range between $T_L$ and $T_H$. In other words, it is necessary to meet the following formula (4).

$$P_0+P_{LOSS}-P<\Delta \text{ and } (1/\alpha)P-P_0<\Delta \quad (4)$$

For example, when the gas is injected at the temperature $T_L$, a gas having a pressure of the range shown with a two-headed arrow may be injected. This can be represented by the following formula (5).

$$P_0+P_{LOSS}-\Delta<P<\alpha(P_0+\Delta) \quad (5)$$

A pressure of the injected gas for minimize the pressure difference occurring in the flow path becomes such as the following formula (6) at the room temperature.

$$\alpha(2P_0+P_{LOSS})/(1+\alpha) \quad (6)$$

A maximum pressure difference generated at that time is presented as the following formula (7).

$$\{(1-\alpha)P_0+P_{LOSS}\}/(1+\alpha) \quad (7)$$

As the gas to be injected, a gas having smaller thermal conductivity in comparison with an air is used in order to prevent the heat quantity from transferring from the fuel cell to the heat insulating container through the gas. For example, carbon dioxide, a freon gas and the like may be used. Moreover, a rare gas having larger molecular mass than that of an air, such as Ar, Kr, Xe and Rn, may be used. Especially Xe has a small thermal conductivity, for example, $1.9\times10^{-2}$(W/K·m) at 1000° C., which is a quarter in comparison with a thermal conductivity, $7.6\times10^{-2}$(W/K·m), of an air at 100° C.

Furthermore, it is preferred to make the thickness of the layer of the gas as thin as possible so as to prevent a temperature distribution from occurring in the reaction area due to an occurrence of natural convection of the gas in the first container. For example, Rayleigh number Ra of the gas in the first container may be sufficiently smaller than critical Rayleigh number Ra (=1708) which is an index of occurrence of natural convection. The Rayleigh number Ra can be presented by the following formula (8).

$$Ra=g\beta\rho C_P\Delta Td/vk \quad (8)$$

Here, g is gravity acceleration, 9.8 m/s$^2$, β is a rate (1/K) (this is nearly 1/T) of thermal expansion of the gas, ρ is a density (kg/m$^3$) of the gas, ΔT is a thermal difference (K) between temperatures of the gas layer near the reaction and near the first container, d is a thickness (m) of the gas layer, v is a dynamic coefficient of viscosity (m$^2$/s) of the gas, and k is a thermal conductivity (J/kgK) of the gas. The thickness of the gas layer may be a thickness that meets the following formula.

$$d \ll \{(1708) v k/[g \rho C_P (\Delta T/T)]\}^{1/3}$$

In order to show an advantage of the present invention, a case where an environment temperature (room temperature) $T_L$=25° C., the operation temperature of the fuel cell $T_H$=800° C., a fluid pressure at the flow path exit $P_0$=1.05 atm, and a fluid pressure at the flow path entry is 1.25 atm, namely the pressure loss $P_{LOSS}$=0.2 atm will be explained as an example. For minimize the pressure difference occurring in the flow path, it is necessary to inject the gas of the pressure of 0.5 atm, which value can be obtained by assigning the above temperature and pressure to the formula (6). At that time, the maximum value of the pressure difference occurring in the flow path becomes 0.75 atm according to the formula (7). This means a stress alleviation of 40% is achieved in comparison with the maximum value of the pressure difference occurring in the flow path when the pressure inside the first container is lower than a normal atmospheric pressure, for example, when the pressure is a vacuum pressure such as 10 Pa or less (namely 9.87×10$^{-5}$ atm or less).

Moreover, an atmospheric pressure in the space 23 between the first container 1 and the second container 2 is allowed to be lower than a normal atmospheric pressure. A pressure of the space 23 where the atmospheric pressure is lowered is 10 Pa or less, more preferably 1 Pa or less. Furthermore, when a distance between the outer wall surface of the first container 1 and the inner wall surface of the second container 2 is not extremely close in comparison with a gas molecule mean free path, the heat transmission does not increase. The distance may be several millimeters, for example. By allowing the distance between the outer wall surface of the first container 1 and the inner wall surface of the second container 2 to be several millimeters, it becomes possible to minimize the heat transmission from the first container 1 to the second container 2 through the gas in the space.

Next, a process of housing the fuel cell 200 in the heat insulating container 100 will be explained. FIGS. 4A-4G are views showing a process of housing the fuel cell 200 in the heat insulating container 100. Incidentally, an example where the first container 1 and the second container 2 are composed of metal will be explained in the following description.

First, the low radiation rate layers 213, 214 are formed on the top surface and the lowermost surface of the fuel cell 200 (see FIG. 4A). The metal films formed as the low radiation rate layers 213, 214 may be formed by methods such as a vapor deposition and a sputtering. Moreover, if necessary, a multiple layer configuration may be adopted by forming the adhesion layer for maintaining the adhesion strength of the low radiation rate layers 213, 214, and further forming a diffusion barrier layer for preventing the adhesion layer from diffusing into the low radiation rate layers 213, 214.

Next, the metal film is formed as the low radiation rate layer 14 on the inner wall surface (the inner wall surface of the container body 11 and the lower surface of the lid section 12) of the first container 1 by the method such as a vapor deposition and a sputtering (see FIG. 4B). A plurality of through-holes 255 are formed in the container body 11, and the metal film is formed in some part other than the through-holes 255. Then, the fuel cell 200 is housed in the container body 11, and the cathode output electrode 254, the anode output electrode 253, the fuel feeding tube 215, the fuel discharging tube 216, the oxygen feeding tube 217 and the oxygen discharging tube 218 are passed through the plurality of the through-holes 255 so as to be attached to the container body 11 (see FIG. 4C). The first container 1 and each of the tubes 215-218 are hermetic-sealed by insulation material, for example, glass material or ceramic material. After that, the opening of the container body 11 is covered with the lid section 12, and the container body 11 is set in a vacuum chamber to be evacuated. At that time, annealing may be performed, for example at 800° C., for desorbing a surface adsorption gas. Then, the gas 16 is injected in the vacuum chamber. As the gas 16, for example, a xenon gas of 0.27 atmospheric pressure may be used. Alternatively, a xenon gas of 1 atmospheric pressure may be injected at the operation temperature of the fuel cell 200, for example 800° C. After that, in the vacuum chamber, the container body 11 and the lid section 12 are hermetic-sealed by an arc welding and the like (see FIG. 4D).

The metal films are subsequently formed as the low radiation rate layers 15, 24 on the outer wall surface of the hermetic-sealed first container 1 and the inner wall surface (the inner surface of the container body 21 and the lower surface of the lid section 22) of the second container 2 by the method such as a vapor deposition and a sputtering (see FIGS. 4E, 4F). A plurality of through-holes 256 are formed in the container body 21, and the metal films are formed in some part other than the through-holes 256. The first container 1 where the low radiation rate layer 15 is formed on the outer wall surface is housed in the container body 21 of the second container 2, the fuel feeding tube 215, the fuel discharging tube 216, the oxygen feeding tube 217 and the oxygen discharging tube 218 are passed through the plurality of through-holes 256 of the container body 21, and the second container 2 and each of the tubes 215-218 are hermetic-sealed by insulation material, for example, glass material or ceramic material. At that time, also the electrodes for thin film heaters 251, 252 are passed through the through-holes 256. Then, the opening of the container body 21 is covered with the lid section 22, and the container body 21 is set in the vacuum chamber to be evacuated. At that time, annealing may be performed, for example at 800° C., for desorbing a surface adsorption gas. After that, the container body 21 and the lid section 22 are hermetic-sealed by a laser beam welding, an electron beam welding and the like (see FIG. 4G).

Next, an operation of the reaction device 300 provided with the fuel cell 200 will be explained based on FIGS. 1 and 2.

Firstly, the reformed gas is supplied from the fuel feeding tube 215 to the fuel feeding flow path 205 under a condition that the fuel cell 200 is heated to about 600-800° C. by applying a voltage to the electrodes for thin film heaters 251, 252 connected to the thin film heater/temperature sensors 210, 212 so that the thin film heater/temperature sensors 210, 212 produce heat, then an air including oxygen is supplied from the oxygen feeding tube 217 to the oxygen feeding flow path 207 by driving an unshown pump. Thus, by the electrochemical reactions of chemical reaction formulas (1)-(3) with the reformed gas supplied to the fuel cell 200 and the air, electric power is extracted. Incidentally, the reformed gas and the air including oxygen not used in the electrochemical reactions are discharged through the fuel discharging tube 216 and the oxygen discharging tube 218 respectively out of the heat insulating container 100.

As described above, the first container 1 to house the fuel cell 200 and the second container 2 to house the first container 1 are provided, the gas 16 is injected in the space 13 between the first container 1 and the fuel cell 200 and the first container 1 is sealed, and the atmospheric pressure in the space 23 between the first container 1 and the second container 2 is allowed to be lower than the normal atmospheric pressure. By this, it becomes possible to reduce the stress caused by the differential pressure between the pressure added to the wall surfaces 205a, 206a, 207a and 208a of the fuel feeding flow path 205 and the oxygen feeding flow path 207 of the fuel cell 200 and the pressure in the space 13 of the first container so as to be able to reduce the thickness of the wall surfaces 205a, 206a, 207a and 208a. As a result, it becomes possible to reduce the thickness of the whole fuel cell 200 and reduce a heat capacity of the fuel cell 200. Meanwhile, since the atmospheric pressure around the first container 1 housing the fuel cell 200 is allowed to be lower than the normal atmospheric pressure for insulating, it is possible to prevent heat dissipation from the reaction area to an ambient environment so that a temperature rise in the reaction area is accelerated.

Especially, since the pressure of the gas 16 is adjusted so that the stress occurring in the wall surfaces 205a, 206a, 207a and 208a of each of the flow paths 205, 207 of the fuel cell 200 equals to or is less than the fracture stress, it is possible to reduce the thickness while preventing each of the flow paths 205, 207 from being fractured.

Moreover, by using xenon as the gas 16 to be injected to the space 13 of the first container 1, it is possible to prevent the heat quantity from moving from the fuel cell 200 to the first container 1 through the gas 16. As a result, heat dissipation from the reaction area to an ambient environment is prevented so that a temperature rise in the reaction area can be accelerated.

Furthermore, by forming the low radiation rate layers 14, 15, 24 on the inner wall surface and outer wall surface of the first container 1 and inner wall surface of the second container 2 respectively, heat transmission from the fuel cell 200 can be reduced. Also by high insulating quality due to a combination of a heat insulating by allowing the atmospheric pressure of the first container 1 and the second container 2 to be lower than the normal atmospheric pressure and a heat radiation insulating with the low radiation rate layers 14, 15 and 24, a temperature rise of the fuel cell 200 can be accelerated.

(Variation 1)

Figure 5:
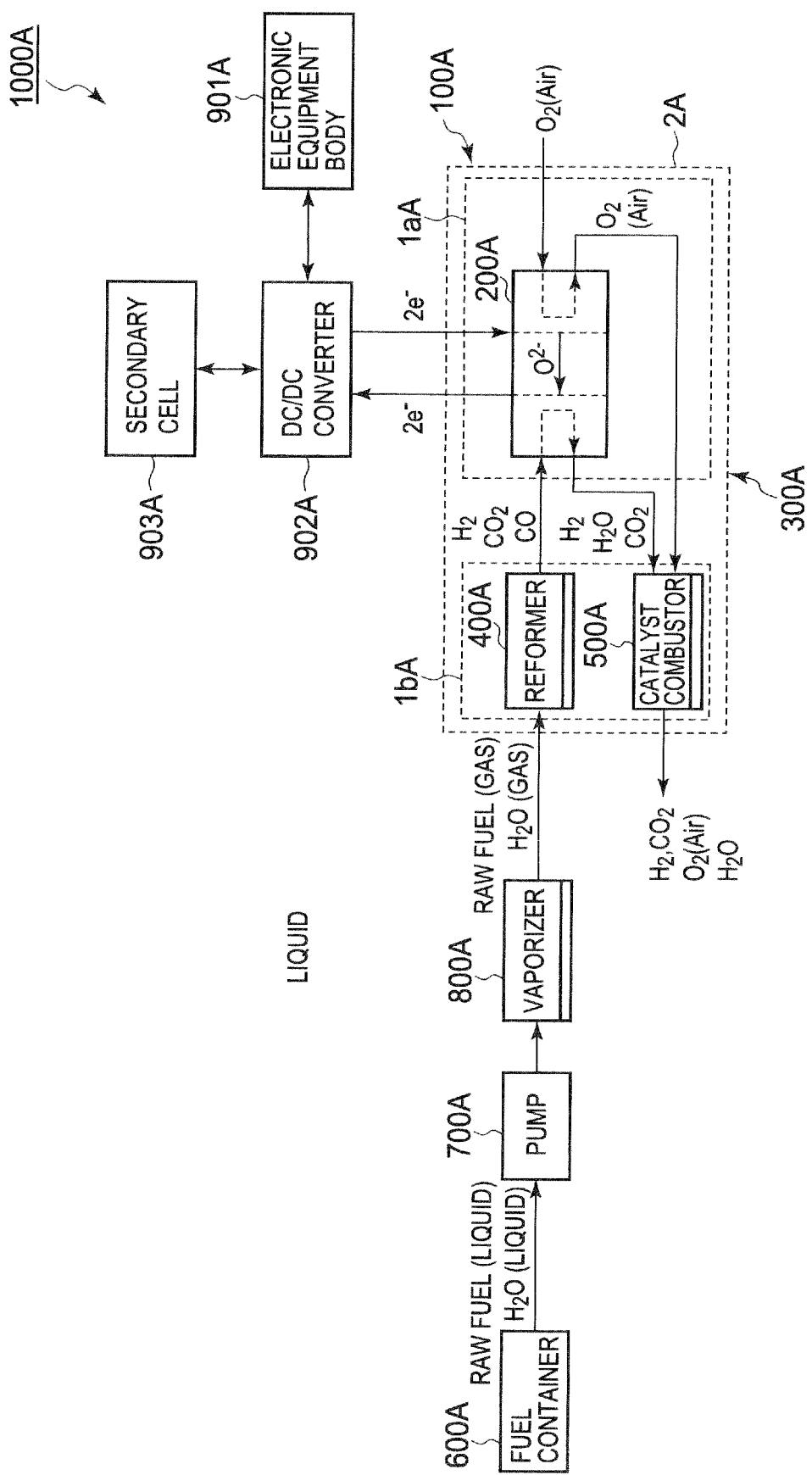
FIG. 5 is a block diagram showing portable electronic equipment 1000A including a reaction device 300A where a fuel cell 200A, a reformer 400A, and a catalyst combustor 500A are housed in a heat insulating container 100A.
Figure 6:
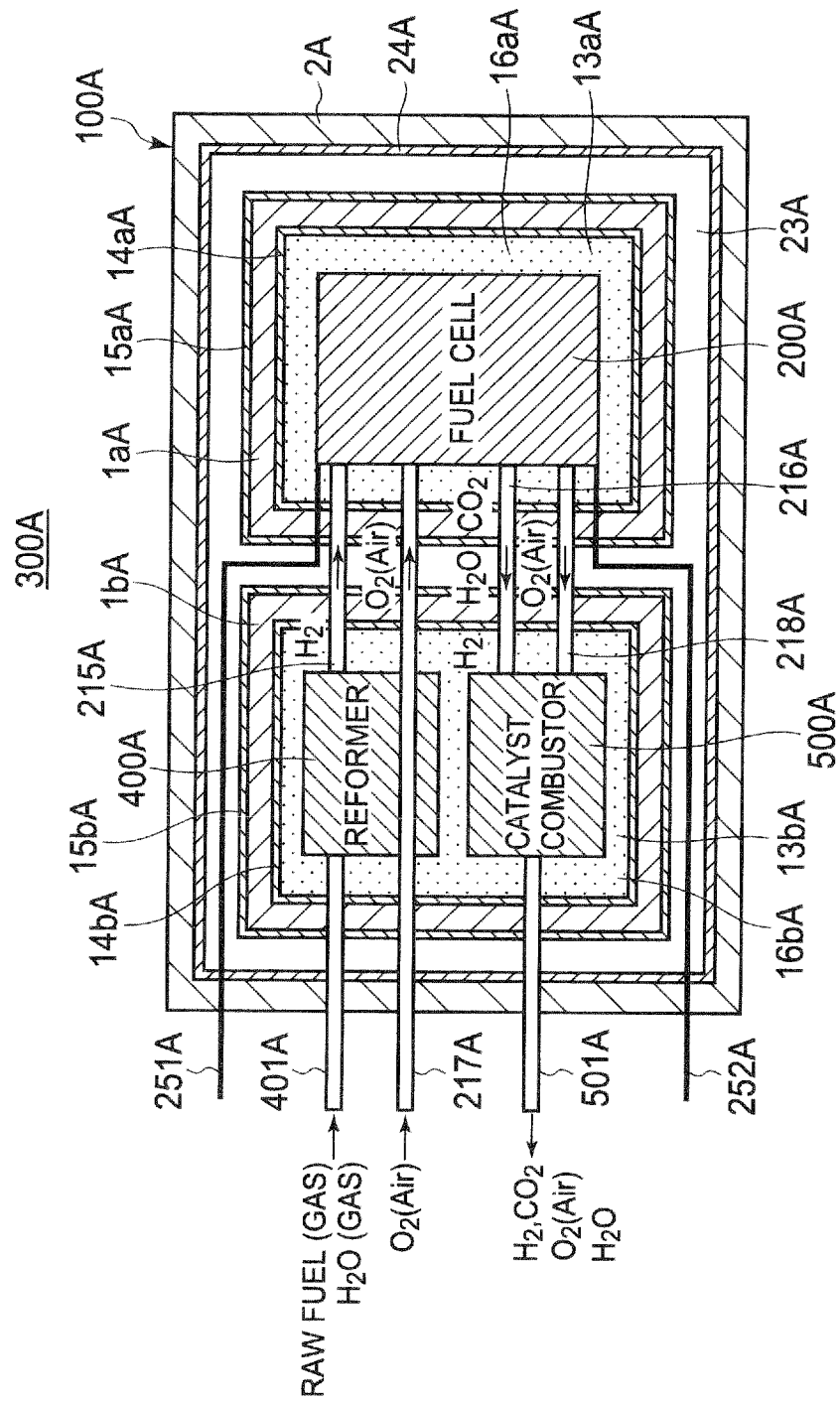
FIG. 6 is a schematic cross sectional view showing an internal structure of the reaction device 300A mounted in the electronic equipment 1000A.

FIG. 5 is a block diagram showing portable electronic equipment 1000A including a reaction device 300A where a fuel cell (reactor) 200A, a reformer (reactor) 400A, and a catalyst combustor (reactor) 500A are housed in a heat insulating container 100A, and FIG. 6 is a schematic cross sectional view showing an internal structure of the reaction device 300A mounted in the electronic equipment 1000A. The electronic equipment 1000A is, for example, portable electronic equipment such as a notebook-size personal computer, PDA, electronic notepads, digital camera, cellular phone, wrist watch, register and projector, The electronic equipment 1000A includes an electronic equipment body 901A, a DC/DC converter 902A, a secondary cell 903A and the like, and a reaction device 300A to be described. The electronic equipment body 901A is driven by electric power supplied from the DC/DC converter 902A or the secondary cell 903A. The DC/DC converter 902A converts electric energy generated by the reaction device 300A to an appropriate voltage to supply it to the electronic equipment body 901A. Moreover, the DC/DC converter 902A charges the secondary cell 903A with the electric energy generated by the reaction device 300A, and supplies the electric energy stored in the secondary cell 903A to the electronic equipment body 901A when the reaction device 300A does not operate.

In Variation 1, the fuel cell 200A is a solid oxide type fuel cell. The heat insulating container 100A includes a first container 1aA to house the solid oxide type fuel cell 200A and a first container 1bA to house the reformer 400A and the catalyst combustor 500A, and these two first containers 1aA, 1bA are housed in a second container 2A. A gas 16aA is injected in a space 13aA between the first container 1aA and the solid oxide type fuel cell 200A and the first container 1aA is sealed. A gas 16bA is injected in a space 13bA between the first container 1bA, and the reformer 400A and the catalyst combustor 500A, and the first container 1bA is sealed. An atmospheric pressure in a space 23A between these two first containers 1aA, 1bA and the second container 2A is allowed to be lower than a normal atmospheric pressure. The reformer 400A and the fuel cell 200A are connected to each other with a fuel feeding tube 215A, and the catalyst combustor 500A and the fuel cell 200A are connected to each other with a fuel discharging tube 216A and an oxygen discharging tube 218A. Furthermore, an oxygen feeding tube 217A connected to an air pump (not shown) is connected to the fuel cell 200A, a mixture gas feeding tube 401A is connected to the reformer 400A, and an offgas discharging tube 501A is connected to the catalyst combustor 500A.

Since configurations of the solid oxide type fuel cell 200A, the first containers 1aA, 1bA and the second container 2A are same as those of the solid oxide type fuel cell 200, the first container 1 and the second container 2 according to the first embodiment described above, same numbers are used with regard to same configurations by adding an alphabetic character A, and alphabetic characters aA, bA for the first containers 1aA, 1bA, and an explanation about same configurations are omitted.

After a fuel stored in a fuel container 600 (see FIG. 5) is supplied to a vaporizer 800A by a pump 700A to be vaporized in the vaporizer 800A, the vaporized mixture gas is sent to the reformer 400A through the mixture gas feeding tube. Here, the fuel is a simple body of a chemical fuel or a mixture of a chemical fuel (raw fuel) and water. As the chemical fuel, alcohols such as methanol and ethanol, and compounds containing a hydrogen element such as gasoline may be used. Incidentally, the chemical fuel and the water may be stored in separate containers respectively.

In the reformer 400A, which is not shown, a catalyst is carried on the wall surface of the inner flow path, and a thin film heater/temperature sensor is provided. The mixture gas sent from the vaporizer is heated to a temperature within a range from about 300° C. to about 400° C. by the heat of the thin film heater/temperature sensor to cause a reforming reaction by the catalyst in the flow path as shown in the following formula (9) and cause a reaction shown in the following formula (10) subsequent to the reaction of the formula (9). As a result, the reformed gas such as hydrogen, carbon dioxide, infinitesimal carbon monoxide as by-products and the like is produced. The produced reformed gas is sent to the fuel cell 200A through the fuel feeding tube 215A.

$$CH_3OH + H_2O \rightarrow 3H_2 + CO_2 \tag{9}$$

$$H_2 + CO_2 \rightarrow H_2O + CO \tag{10}$$

Reactions shown in the following electrochemical reaction formulas (11), (12) occur in a fuel electrode of the fuel cell 200A, and a reaction shown in the following electrochemical reaction formula (13) occurs in an oxygen electrode of the fuel cell 200. A generated electron is supplied to the anode output electrode, and a generated oxygen ion is supplied to the fuel electrode through an electrolyte.

$$H_2 + O^{2-} \rightarrow H_2O + 2e^- \tag{11}$$

$$CO + O^{2-} \rightarrow CO_2 + 2e^- \tag{12}$$

$$\tfrac{1}{2}O_2 + 2e^- \rightarrow O^{2-} \tag{13}$$

The catalyst combustor 500A is set at a necessary temperature for heating the reformer 400A to cause the reaction of the chemical reaction formula (9) well. The hydrogen which was not used in the reaction and a moisture vapor and carbon dioxide which are generated by the reaction, as the offgas discharged from the fuel discharging tube 216A of the fuel cell 200A, and the air where oxygen concentration is reduced by electric power generation as the offgas discharged from the oxygen discharging tube 218A, are sent to the catalyst combustor 500A to burn again, and the reformer 400A is heated by this combustion heat. The offgas including hydrogen which was not used for the combustion, carbon dioxide, the air including oxygen and the like, and water and the like generated by the combustion are discharged as an emission out of the heat insulating container 100A through the offgas discharging tube 501A.

Incidentally, also the vaporizer is provided with a thin film heater/temperature sensor (not shown) as the reformer 400A. Since an electric resistance value of the thin film heater/temperature sensor depends on a temperature, the thin film heater/temperature sensor functions also as a temperature sensor to measure temperatures of the vaporizer and the reformer 400A.

(Variation 2)

Figure 7:
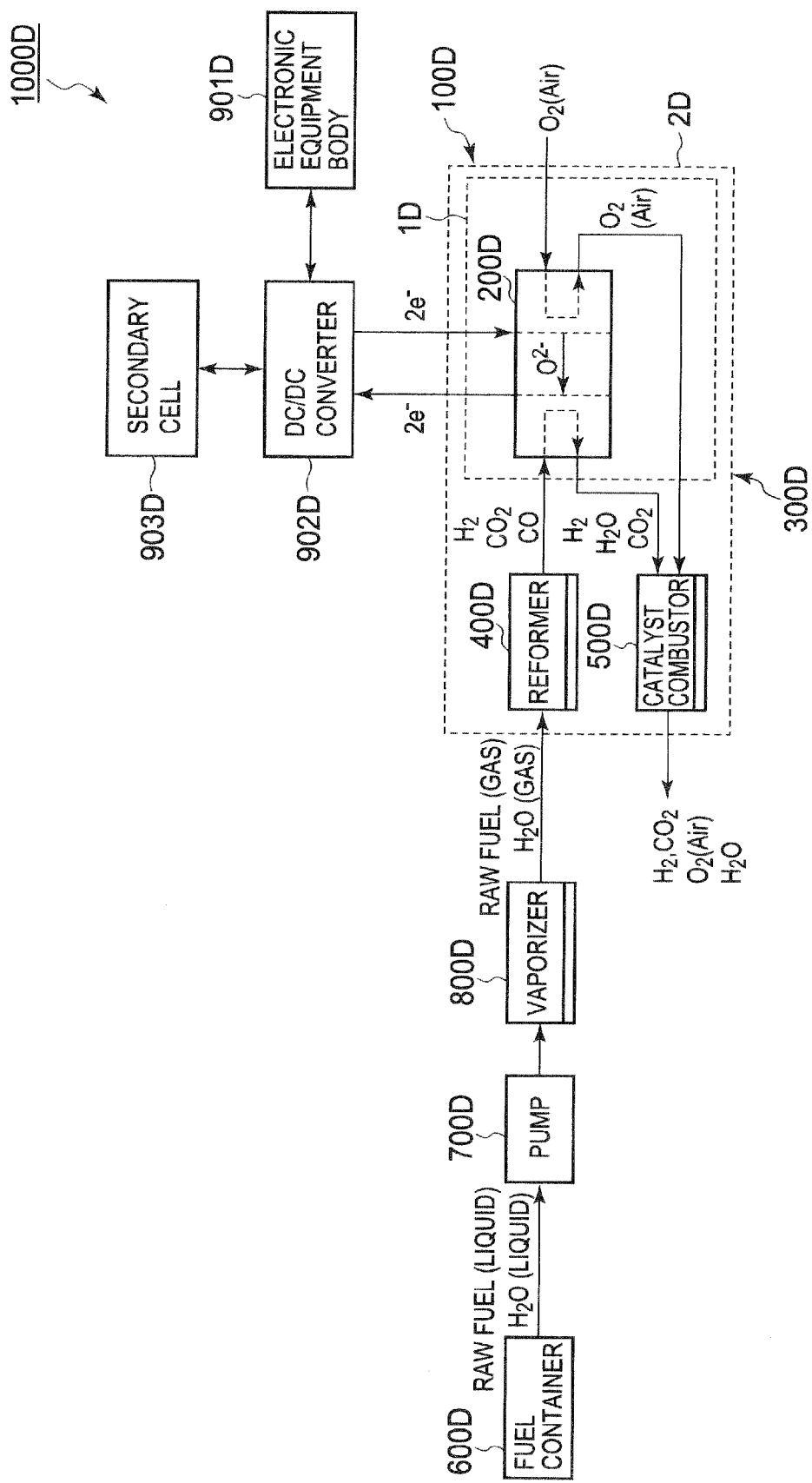
FIG. 7 is a block diagram showing portable electronic equipment 1000D including a reaction device 300D where a fuel cell 200D, a reformer 400D, and a catalyst combustor 500D are housed in a heat insulating container 100D.
Figure 8:
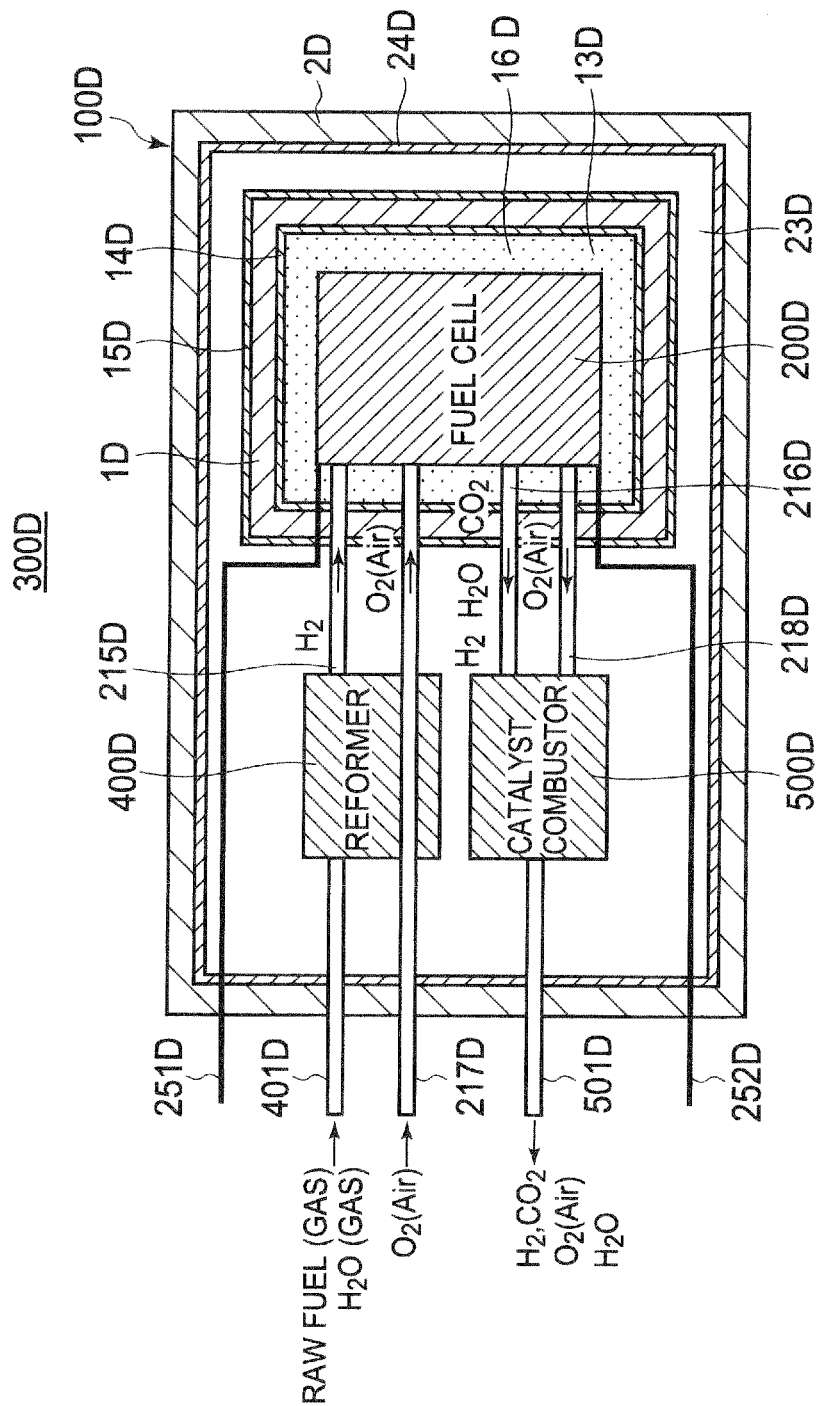
FIG. 8 is a schematic cross sectional view showing an internal structure of the reaction device 300D mounted in the electronic equipment 1000D.

FIG. 7 is a block diagram showing portable electronic equipment 1000D including a reaction device 300D where a fuel cell (reactor) 200D, a reformer (reactor) 400D, and a catalyst combustor (reactor) 500D are housed in a heat insulating container 100D, and FIG. 8 is a schematic cross sectional view showing an internal structure of the reaction device 300D mounted in the electronic equipment 1000D.

A difference of Variation 2 from Variation 1 is that a first container to house the reformer 400D and the catalyst combustor 500D is not provided. With regard to each configuration shown in FIGS. 7 and 8, each reference number of corresponding configurations in FIGS. 5 and 6 is used by replacing trailing character "A" with "D", and an explanation about the corresponding configurations is omitted.

As shown in FIGS. 7 and 8, the reaction device 300D of Variation 2 includes a first container 1D to house a solid oxide type fuel cell 200D and a second container 2D to house the first container 1D, a reformer 400D and a catalyst combustor 500D. An atmospheric pressure in a space 23D between the first container 1D, the reformer 400D and the catalyst combustor 500D, and the second container 2D, is allowed to be lower than the normal atmospheric pressure. The reformer 400D and the fuel cell 200D are connected to each other with the fuel feeding tube 215D, and the catalyst combustor 500D and the fuel cell 200 are connected to each other with the fuel discharging tube 216D and the oxygen discharging tube 218D. An oxygen feeding tube 217D which is connected to an air pump (not shown) and supplies an air including oxygen to the fuel cell 200D is connected to an oxygen feeding flow path 207D (not shown) of the fuel cell 200D, and the fuel feeding tube 215D which is connected to a pump 700D and supplies a reformed gas to the fuel cell 200D is connected to a fuel feeding flow path 205D (not shown) of the fuel cell 200D.

Here, since the solid oxide type fuel cell 200D operates at higher temperature in comparison with the reformer 400D and the catalyst combustor 500D, it takes much time to reach the operation temperature. Therefore, it is preferable to accelerate a temperature rising time of the solid oxide type fuel cell 200D in order to shorten a starting time of the reaction device 300D and the electronic equipment 1000D.

Variation 2 is not provided with the first container to house the reaction device the temperature rising time of which is shorter and which has lower temperature, and provided with the first container to house the reaction device the temperature rising time of which is longer and which has higher temperature. Thus, since the first container to house the reformer 400D and the catalyst combustor 500D is not provided, it is possible to reduce the number of components, and thereby process yield can be improved, in addition to preventing the heat capacity of the reaction area from increasing, and accelerating heat rising time, as the first embodiment.

Second Embodiment

Figure 9:
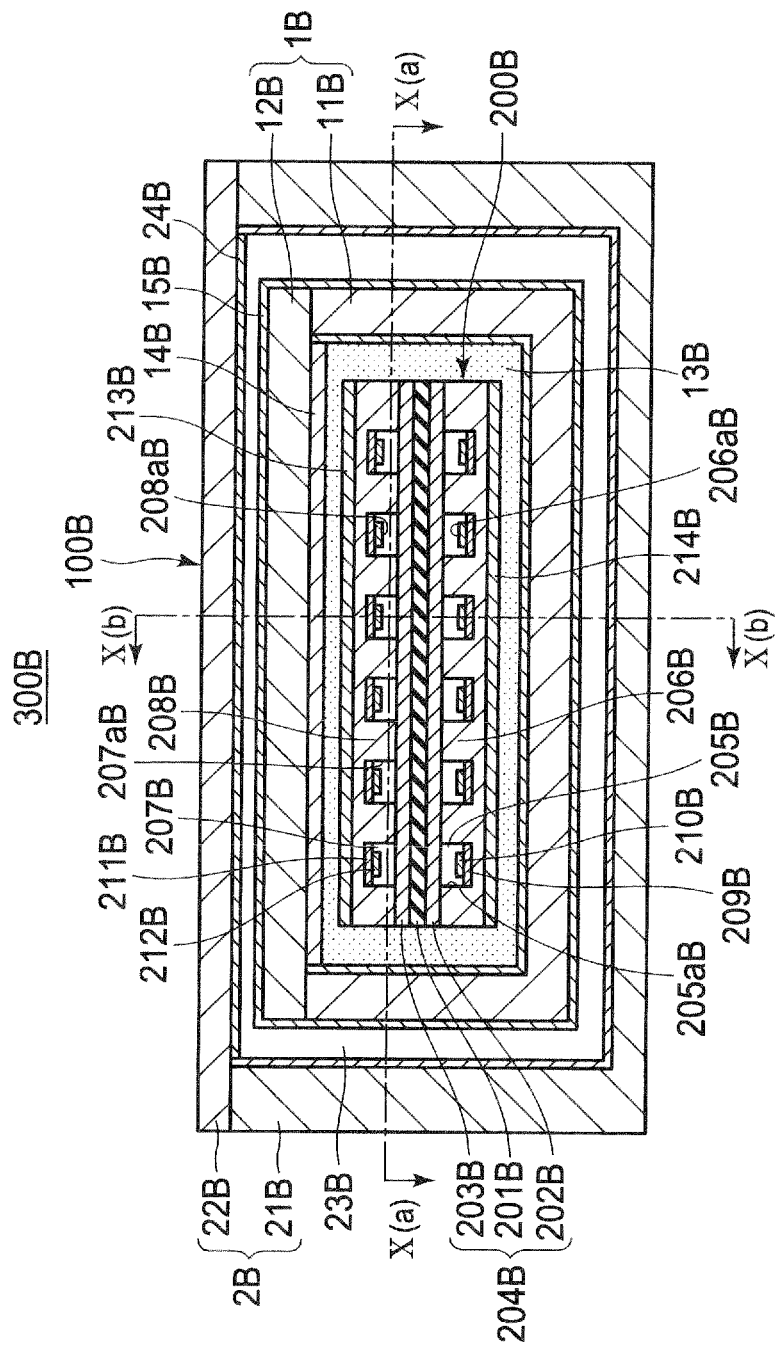
FIG. 9 is a longitudinal sectional view showing a internal structure of a reaction device 300B where a fuel cell 200B is housed in an heat insulating container 100B.
Figure 10A:
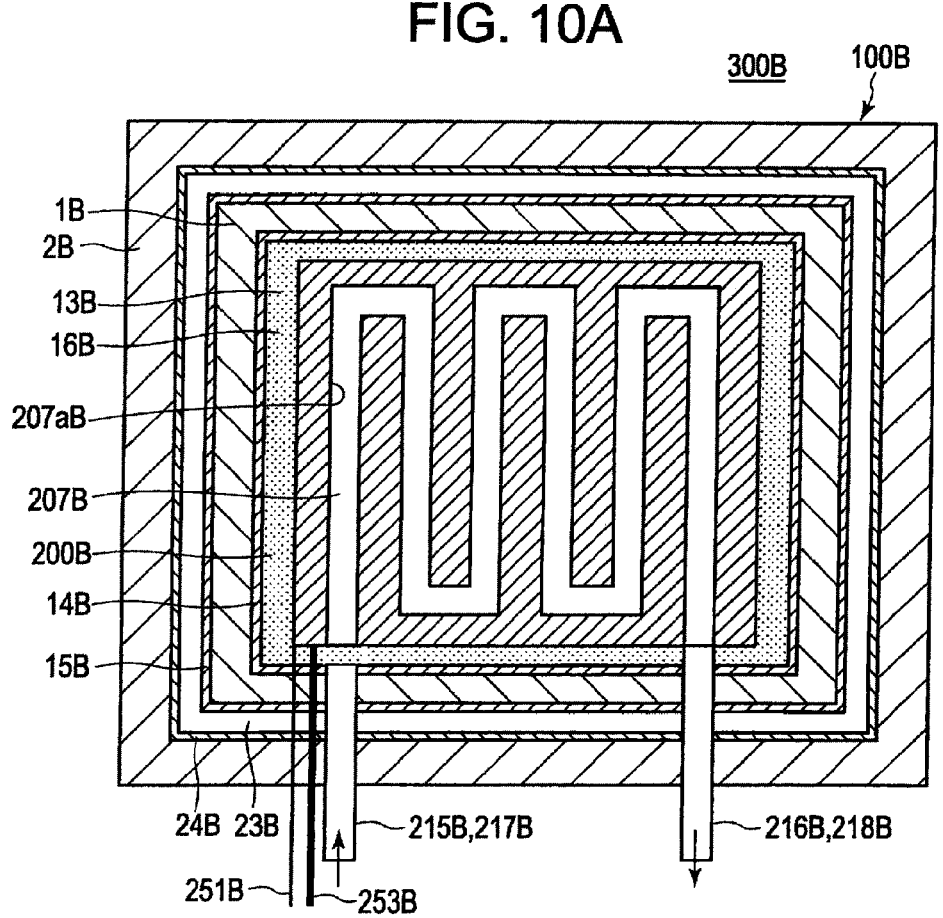
FIG. 10A is a fragmentary view when
Figure 10B:
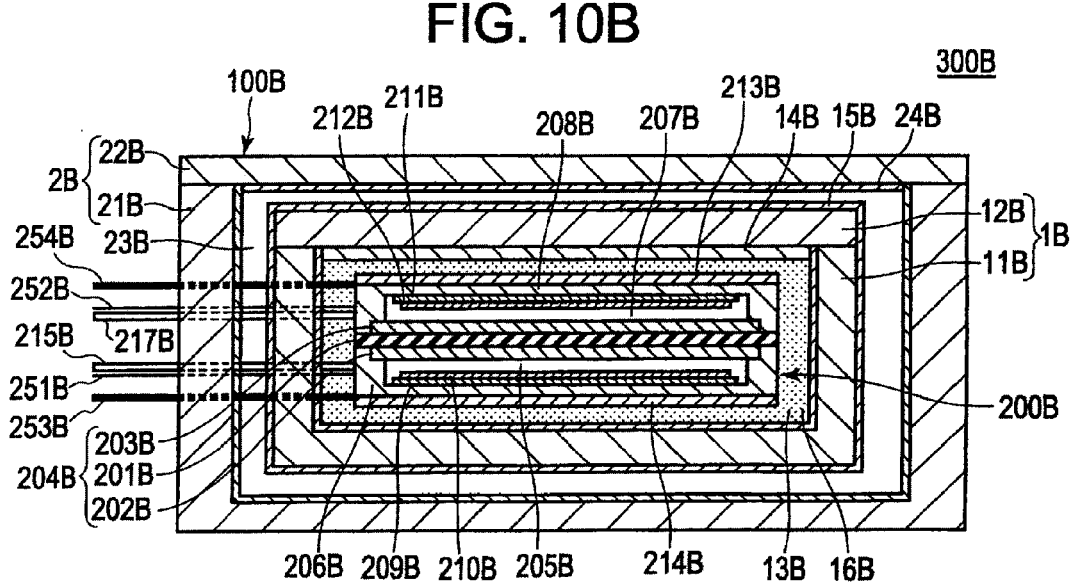
FIG. 10B is a fragmentary view when

FIG. 9 is a longitudinal sectional view showing a internal structure of a reaction device 300B where a fuel cell (reactor) 200B is housed in an heat insulating container 100B, FIG. 10A is a fragmentary view when FIG. 9 is cut along a cutting plane line X(a)-X(a), and FIG. 10B is a fragmentary view when FIG. 9 is cut along a cutting plane line X(b)-X(b).

In the second embodiment, unlike the first embodiment, an oxygen feeding flow path 207B of the fuel cell 200B housed in a first container 1B is communicated with a space 13B between the first container 1B and the fuel cell 200B. Moreover, an oxygen feeding tube 217B is not directly connected to the oxygen feeding flow path 207B, but is communicated with the space 13B in the first container 1B. Since other configurations are same as those of the first embodiment, alphabetic characters B are added to same reference numbers and an explanation about the same configuration is omitted.

Incidentally, in the case of welding a container body 11B and a lid section 12B of the first container 1B, welding can be performed in a vacuum as the first embodiment, and further can be performed under an inert gas atmosphere. As a welding method, an electron beam welding, a laser beam welding, arc welding and the like may be adopted.

As described above, the first container 1B to house the fuel cell 200B and the second container 2B to house the first container 1B are provided, the oxygen feeding flow path 207B of the fuel cell 200B is communicated with the space 13B between the fuel cell 200B and the first container 1B, and the atmospheric pressure in the space 23B between the first container 1B and the second container 2B is allowed to be lower than the normal atmospheric pressure. By supplying the air including oxygen into the space 13B in the first container 1B, the air including oxygen is sent to an oxygen electrode 203B, thereby pressures from within and without to wall surfaces 207aB, 208aB which form the oxygen feeding flow path 207B can be approximately equalized consistently so that a stress caused by a pressure difference are reduced substantially in comparison with the first embodiment, approximately to zero. Moreover, also with regard to pressures from within and without to the wall surfaces 205aB, 206aB of the fuel feeding flow path 205B on the fuel electrode 202B side, since a pressure of the gas including oxygen injected in the space 13B of the first container 1B is nearly equal to a pressure of the reformed gas flowing through the fuel feeding flow path 205B, a stress caused by a pressure difference can be reduced approximately to zero. Also in this case, it is possible to reduce a stress due to a differential pressure between the pressures added to the wall surfaces 205aB, 206aB, 207aB and 208aB of each of the flow paths 205B and 207B of the fuel cell 200B and the pressure in the space 13B of the first container 1B so that the thickness of the wall surfaces 205aB, 206aB, 207aB and 208aB can be reduced.

Therefore, the thickness of the whole fuel cell 200B can be reduced, and a heat capacity of the fuel cell 200B can be reduced. At the same time, since the atmospheric pressure around the first container 1B housing the fuel cell 200B is allowed to be lower than the normal atmospheric pressure for insulating, heat dissipation from the reaction area to an ambient environment can be prevented so that a temperature rise in the reaction area can be accelerated. Also by high insulating quality due to a combination of a heat insulating by allowing the atmospheric pressure inside the first container 1B and the second container 2B to be lower than the normal atmospheric pressure and the heat radiation insulating with the low radiation rate layers 14B, 15B, and 24B, a temperature rise in the reaction area can be accelerated.

[Variation 3]

Figure 11:
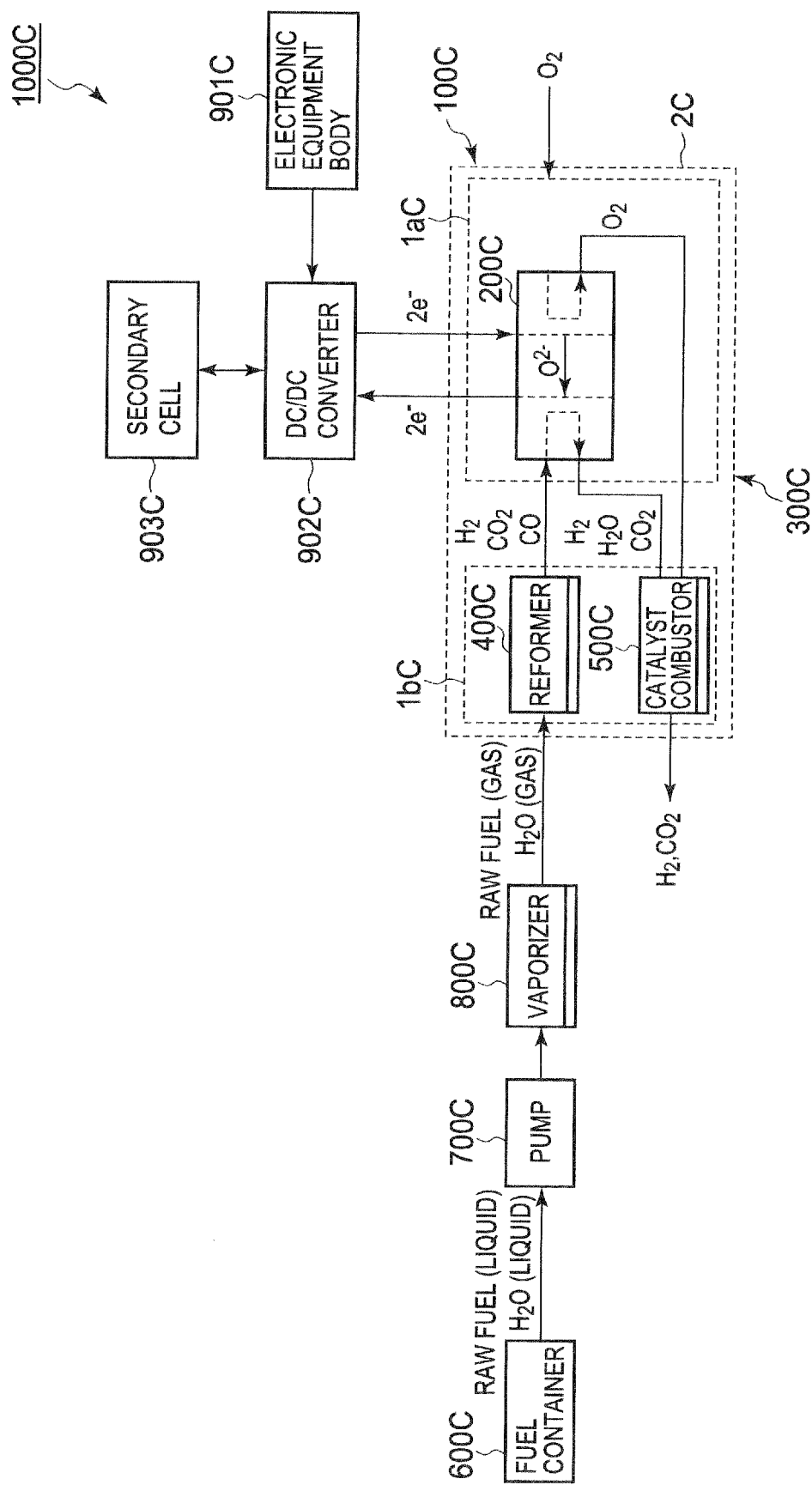
FIG. 11 is a block diagram showing portable electronic equipment 1000C including a reaction device 300C where a fuel cell 200C, a reformer 400C, and a catalyst combustor 500C are housed in a heat insulating container 100C.
Figure 12:
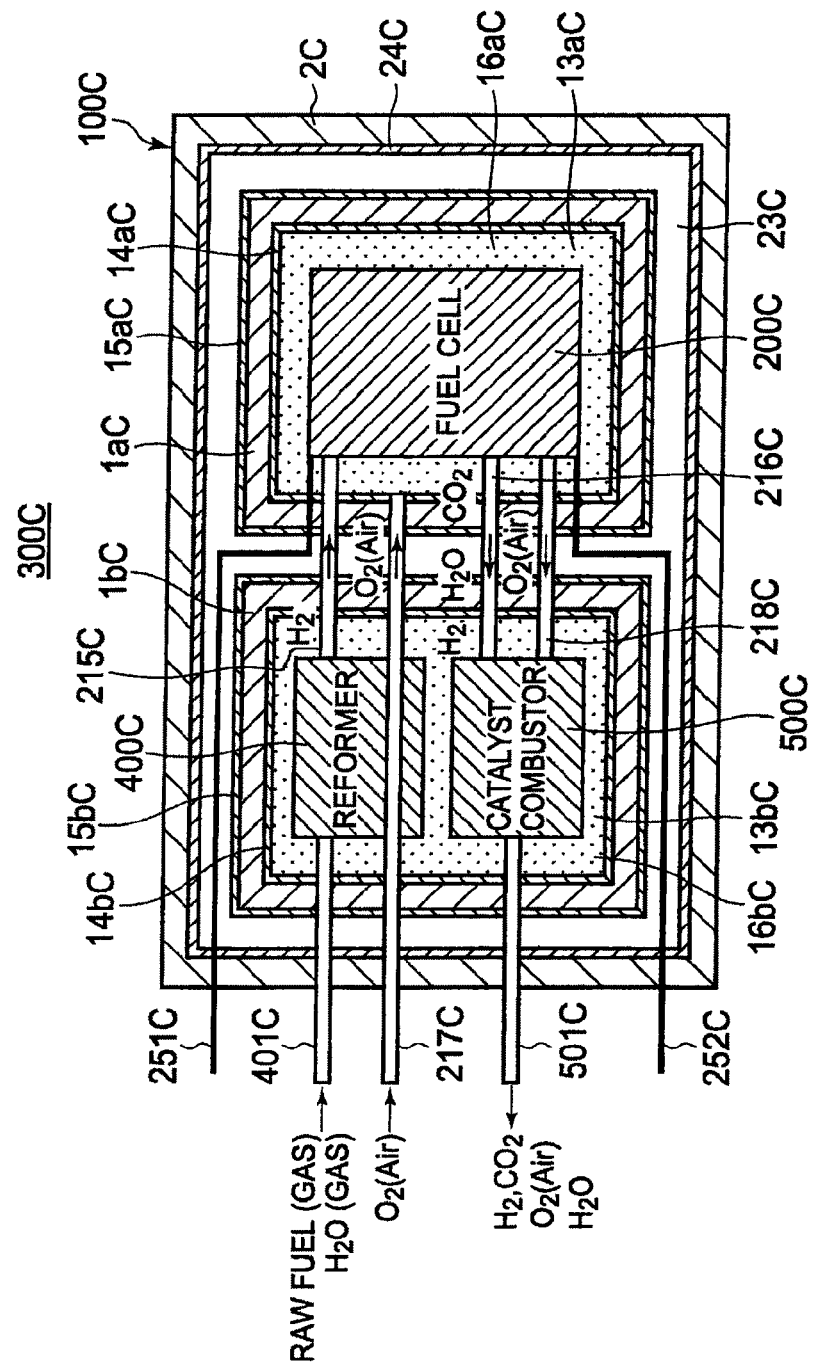
FIG. 12 is a schematic cross sectional view showing an internal structure of the reaction device 300C mounted in the electronic equipment 1000C.

FIG. 11 is a block diagram showing portable electronic equipment 1000C including a reaction device 300C where a fuel cell (reactor) 200C, a reformer (reactor) 400C, and a catalyst combustor (reactor) 500C are housed in a heat insulating container 100C, and FIG. 12 is a schematic cross sectional view showing an internal structure of the reaction device 300C mounted in the electronic equipment 1000C.

In Variation 3, a fuel cell 200C is a solid oxide type fuel cell. A heat insulating container 100C includes a first container 1aC to house the solid oxide type fuel cell 200C and a second container 1bC to house a reformer 400C and a catalyst combustor 500C, and these two first containers 1aC, 1bC are housed in the second container 2C. An atmospheric pressure in a space 23C between the two first containers 1aC, 1bC and the second container 2C is allowed to be lower than a normal atmospheric pressure. The reformer 400C and the fuel cell 200C are connected to each other with a fuel feeding tube 215C, and the catalyst combustor 500C and the fuel cell 200C are connected to each other with a fuel discharging tube 216C and an oxygen discharging tube 218C. An oxygen feeding tube 217C which is connected to an air pump (not shown) and supplies an air including oxygen to the fuel cell 200C, and an oxygen feeding flow path (not shown), are communicated with a space 13aC between the first container 1aC and the fuel cell 200C as the second embodiment, and the oxygen feeding tube 217C, the oxygen feeding flow path and the space 13aC share the air.

With regard to other configurations, since configurations of the solid oxide type fuel cell 200C, the first containers 1aC, 1bC and the second container 2C are same as those of the solid oxide type fuel cell 200, the first container 1 and the second container 2 according to the first embodiment described above, and since the reformer 400C and the catalyst combustor 500C are same as the reformer 400A and the catalyst combustor 500A, alphabetic characters C, and alphabetic characters aC, bC for the first container 1aC, 1bC, are added to same reference numbers, and an explanation about the same configuration is omitted.

[Variation 4]

Figure 13:
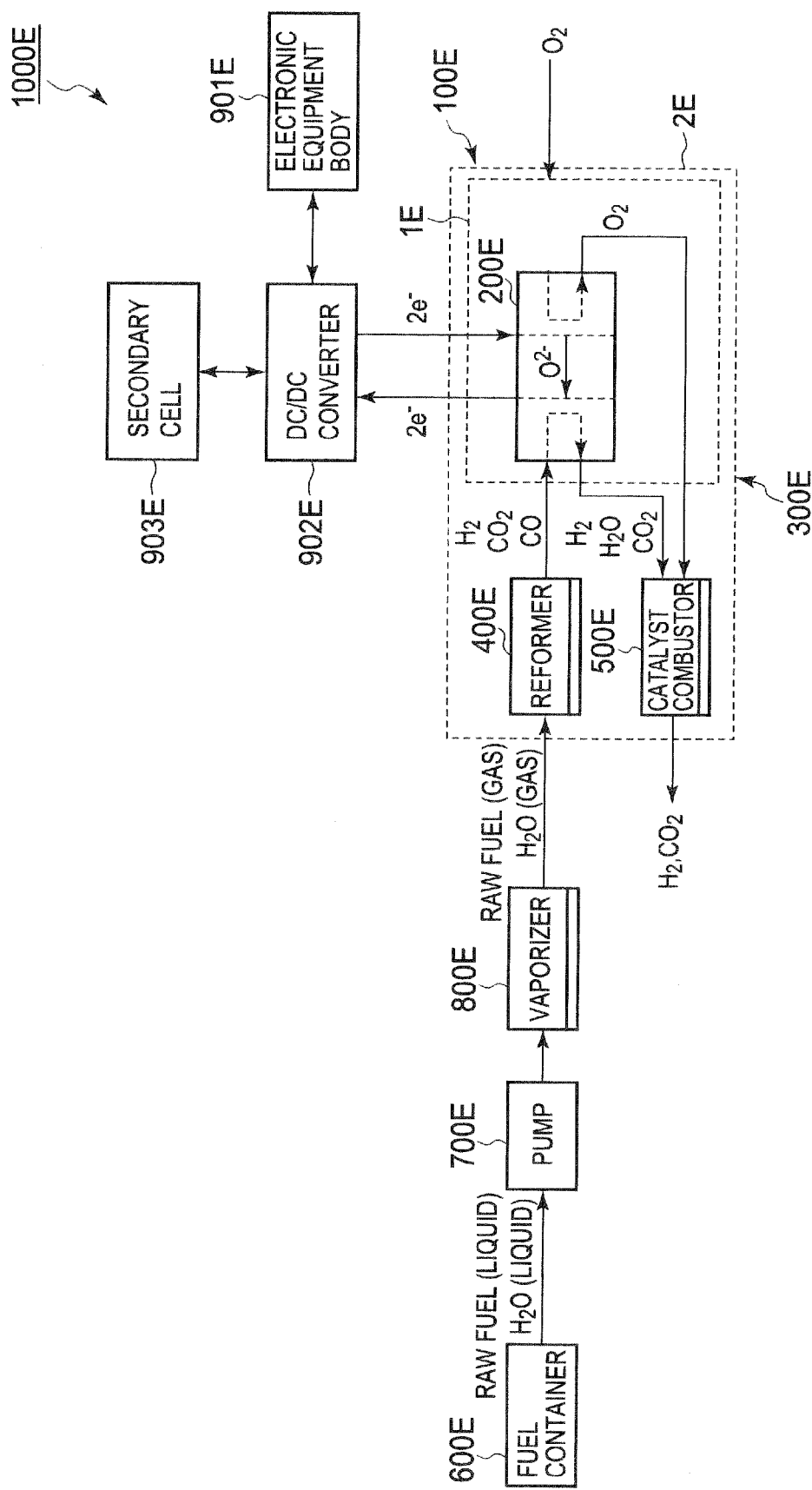
FIG. 13 is a block diagram showing portable electronic equipment 1000E including a reaction device 300E where a fuel cell 200E, a reformer 400E, and a catalyst combustor 500E are housed in a heat insulating container 100E.
Figure 14:
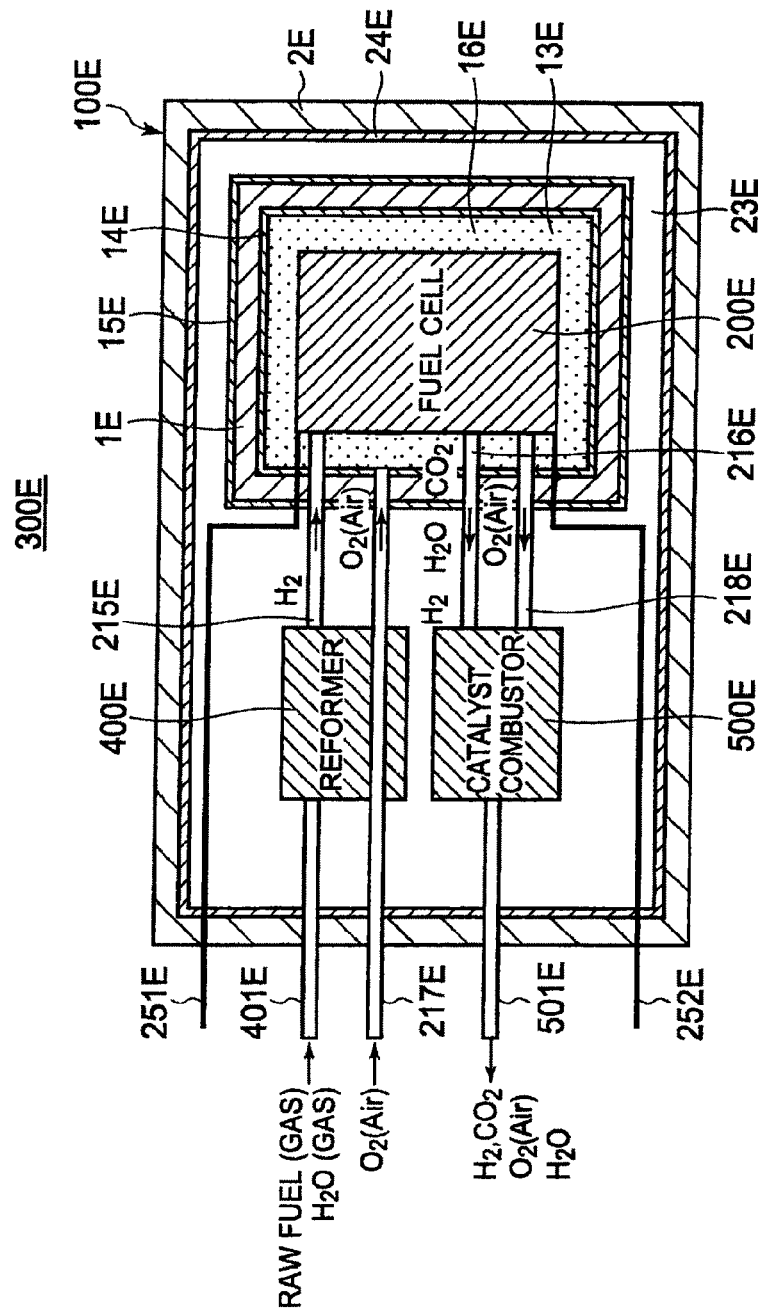
FIG. 14 is a schematic cross sectional view showing an internal structure of the reaction device 300E mounted in the electronic equipment 1000E.

FIG. 13 is a block diagram showing portable electronic equipment 1000E including a reaction device 300E where a fuel cell (reactor) 200E, a reformer (reactor) 400E, and a catalyst combustor (reactor) 500E are housed in a heat insulating container 10E, and FIG. 14 is a schematic cross sectional view showing an internal structure of the reaction device 300E mounted in the electronic equipment 1000E.

A difference of Variation 4 from above-described Variation 3 is that a first container to house the reformer 400C and the catalyst combustor 500C is not provided. With regard to each configuration shown in FIGS. 13 and 14, each reference number of corresponding configurations in FIGS. 11 and 12 is used by replacing trailing character "C" with "E", and an explanation about the corresponding configurations is omitted.

As shown in FIGS. 13 and 14, a reaction device 300E of Variation 4 includes a first container 1E to house the solid oxide type fuel cell 200E and a second container 2E to house the first container 1E, the reformer 400E and the catalyst combustor 500E, and an atmospheric pressure in a space 23E between the first container 1E, the reformer 400E and the catalyst combustor 500E, and the second container 2E, is allowed to be lower than the normal atmospheric pressure. The reformer 400E and the solid oxide type fuel cell 200E are connected to each other with a fuel feeding tube 215E, and the catalyst combustor 500E and the solid oxide type fuel cell 200E are connected to each other with a fuel discharging tube 216E and an oxygen discharging tube 218E. An oxygen feeding tube 217E which is connected to an air pump (not shown) and supplies an air including oxygen to the solid oxide type fuel cell 200E, and an oxygen feeding flow path 207E (not shown) of the fuel cell 200E, are communicated with a space 13E between the first container 1E and the solid oxide type fuel cell 200E, and the fuel feeding tube 215E which is connected to a pump 700E and supplies a reformed gas to the fuel cell 200E is connected to a fuel feeding flow path 205E (not shown) of the fuel cell 200E.

The reaction device 300E and the electronic equipment 1000E of Variation 4 have same advantages as above-described Variation 2. Specifically, the reaction device 300E and the electronic equipment 1000E of Variation 4 are not provided with the first container to house the reaction device the temperature rising time of which is shorter and which has lower temperature, and are provided with the first container to house the reaction device the temperature rising time of which is longer and which has higher temperature. Thus, as in the above-described Variation 2, since the first container to house the reformer 400E and the catalyst combustor 500E is not provided, it is possible to reduce the number of components, and thereby process yield can be improved, in addition to preventing the heat quantity of the reaction area from increasing, and accelerating heat rising time.

Figure 15:
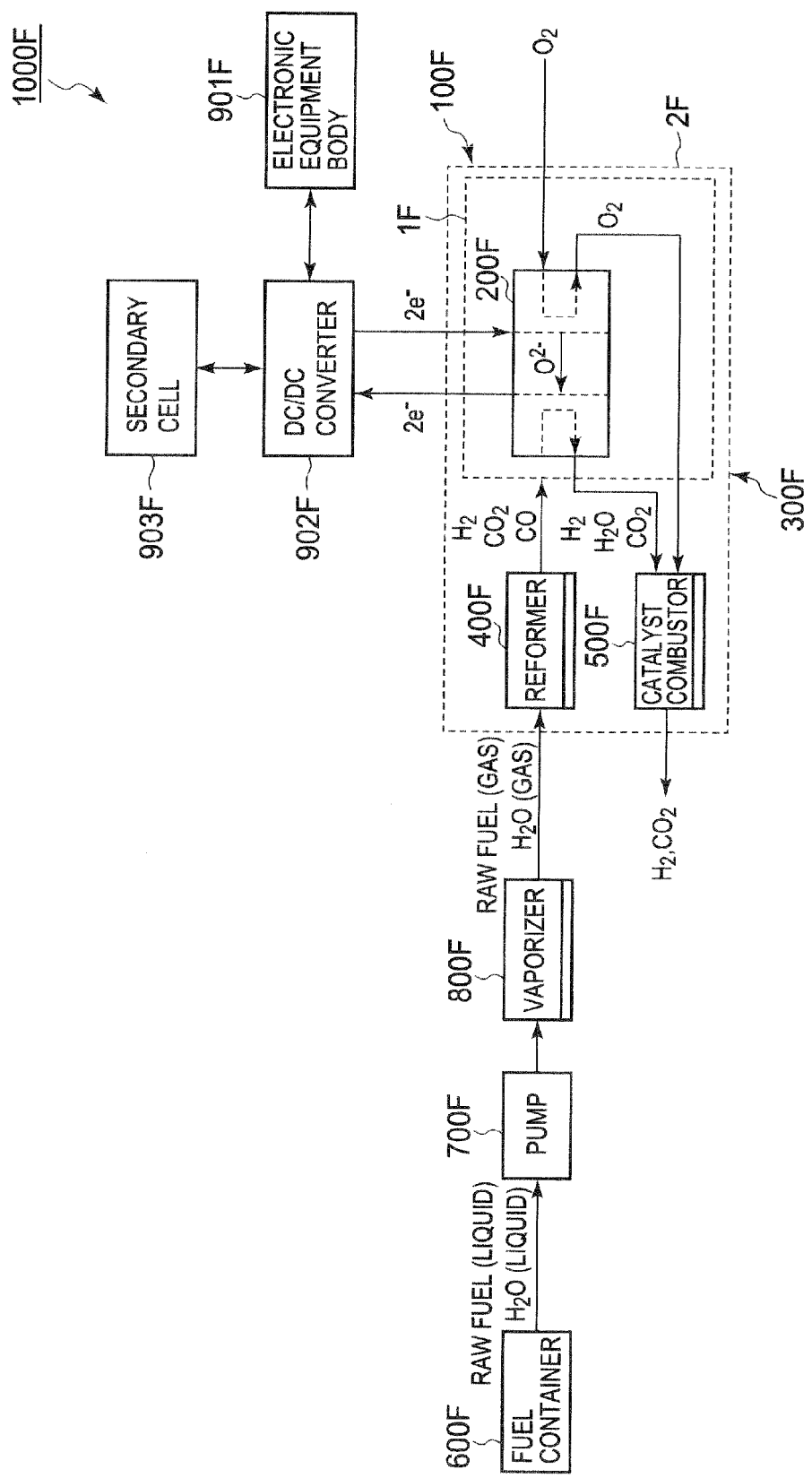
FIG. 15 is a block diagram showing portable electronic equipment 1000F including a reaction device 300F where a fuel cell 200F, a reformer 400F, and a catalyst combustor 500F are housed in a heat insulating container 100F.
Figure 16:
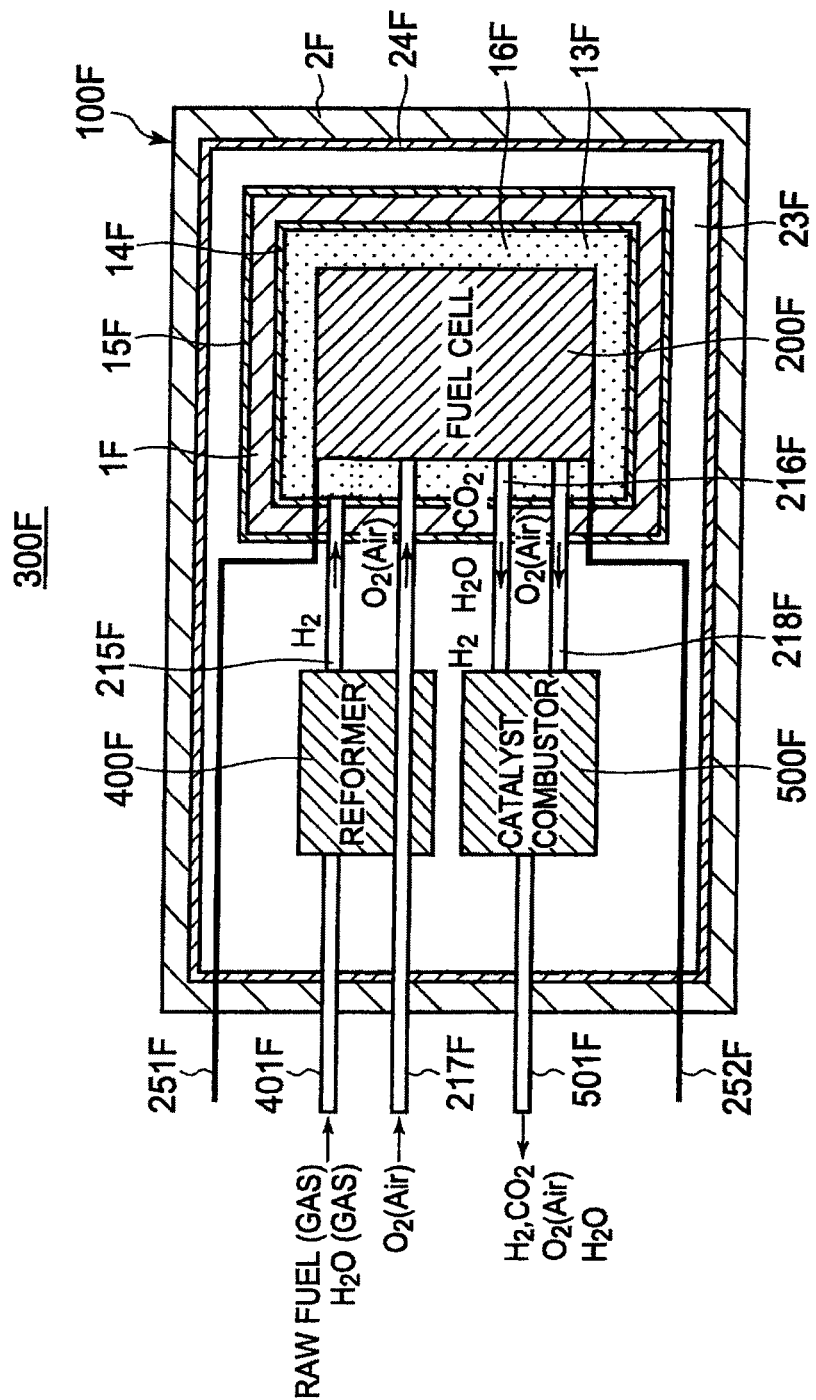
FIG. 16 is a schematic cross sectional view showing an internal structure of the reaction device 300F mounted in the electronic equipment 100F.

Incidentally, in the above-described second embodiment, Variation 3 and Variation 4, the oxygen feeding flow paths 207B, 207C and 207E and the oxygen feeding tubes 217B, 217C and 217E of the fuel cells 200B, 200C and 200E housed in the first containers 1B, 1aC and 1E are communicated with the spaces 13B, 13aC and 13E between the first containers 1B, 1aC and 1E and the fuel cells 200B, 200C and 200E, but the configurations are not limited to the above configurations. For example, as shown in FIGS. 15 and 16, a fuel feeding flow path 205F (not shown) of a fuel cell 200F housed in a first container 1F may be communicated with a space 13F between the first container 1F and the fuel cell 200F, a fuel feeding tube 215F may be communicated with the space 13F of the first container 1F without being directly connected to the fuel feeding flow path 205F, and an oxygen feeding tube 217F may be directly communicated with an oxygen feeding flow path 207F (not shown).

Moreover, in above-described Variation 1 and Variation 3, the fuel cells 200A, 200C are housed in one of the first containers 1aA, 1aC, the reformers 400A, 400C and the catalyst combustors 500A, 500C are housed in the other of the first containers 1bA, 1bC, and these two first containers 1aA, 1bA or 1aC, 1bC are housed in the second containers 2A, 2C respectively. However, the configurations are not limited to the above configurations. The configuration where a plurality of reactors are housed in one of the first containers, and the first container is housed in the second container may be adopted. The number of the reactors and the first containers may be appropriately changed. Moreover, the reactors to be housed are not limited to reactors of different functions, and may be reactors of same functions. Incidentally, same modification is possible also in Variation 2 and Variation 4.

Furthermore, although all of the fuel cells are explained as solid oxide type fuel cells in the above-described first embodiment, second embodiment and Variations 1-4, the present invention may be applied to not only a solid oxide type fuel cell, but also a polymer electrolyte fuel cell, a molten carbonate fuel cell, and the like.

All of the disclosures including the patent specification, the claims, the attached drawings and the abstract of Japanese Patent Application No. 2007-324645 filed Dec. 17, 2007 are herein incorporated by reference.

Although various typical embodiments have been shown and described, the present invention is not limited to those embodiments. Consequently, the scope of the present invention can be limited only by the following claims.

What is claimed is:

1. An electronic equipment comprising:
a reaction device which comprises:
   a reactor to cause a reaction of a fuel and oxygen, wherein the reactor is a fuel cell which generates electric power by an electrochemical reaction of the fuel and the oxygen, and includes an electrolyte, an anode formed on a first side of the electrolyte, a cathode formed on a second side of the electrolyte, a first flow path through which the fuel flows and is supplied to the anode, and a second flow path through which the oxygen flows and is supplied to the cathode;
   a first container to house the reactor as a whole so that a first space is formed between the first container and the reactor, the first container hermetically sealing the first space;
   a second container to house the first container as a whole so that a second space is formed between the second container and the first container, the second container hermetically sealing the second space;
   a feeding tube which is disposed so as to penetrate the second container and the first container and communicate with the first space, and through which one of the fuel supplied to the first flow path of the reactor and the oxygen supplied to the second flow path of the reactor flows; and
   a discharging tube which is disposed so as to penetrate the second container and the first container and communicate with one end portion of one of the first flow path and the second flow path, and through which a discharge from the reactor flows;
   wherein the other end portion of said one of the first flow path and the second flow path of the reactor is communicated with the first space between the reactor and the first container;
   wherein an atmospheric pressure in the second space between the first container and the second container is lower than a normal atmospheric pressure;
an electronic equipment body which is electrically connected to the fuel cell and which is operable using the electric power generated by the fuel cell;
a reformer which is coupled to the feeding tube and which produces a reformed gas as the fuel from a raw fuel which is material to produce the fuel, and which transmits the reformed gas to the reactor through the feeding tube; and
a catalyst combustor which is coupled to the discharging tube and which performs combustion of an offgas as the discharge which is transmitted from the reactor through the discharging tube;
wherein the reformer and the catalyst combustor are disposed in the second space between the first container and the second container.

2. An electronic equipment, comprising:
a reactor to cause a reaction of a fuel and oxygen, wherein the reactor is a fuel cell which generates electric power by an electrochemical reaction of the fuel and the oxygen, and includes an electrolyte, an anode formed on a first side of the electrolyte, a cathode formed on a second side of the electrolyte, a first flow path through which the fuel flows and is supplied to the anode, and a second flow path through which the oxygen flows and is supplied to the cathode;
a first container to house the reactor as a whole so that a first space is formed between the first container and the reactor, the first container hermetically sealing the first space;
a second container to house the first container as a whole so that a second space is formed between the second container and the first container, the second container hermetically sealing the second space;
a feeding tube which is disposed so as to penetrate the second container and the first container and communicate with the first space, and through which the fuel supplied to the first flow path of the reactor flows; and
a discharging tube which is disposed so as to penetrate the second container and the first container and communicate with one end portion of one of the first flow path and the second flow path, and through which a discharge from the reactor flows;
an electronic equipment body which is electrically connected to the fuel cell and which is operable using the electric power generated by the fuel cell;
a reformer which is coupled to the feeding tube and which produces a reformed gas as the fuel from a raw fuel which is material to produce the fuel, and which transmits the reformed gas to the reactor through the feeding tube; and
a catalyst combustor which is coupled to the discharging tube and which performs combustion of an offgas as the discharge which is transmitted from the reactor through the discharging tube;
wherein the other end portion of said one of the first flow path and the second flow path of the reactor is communicated with the first space between the reactor and the first container;
wherein an atmospheric pressure in the second space between the first container and the second container is lower than a normal atmospheric pressure; and
wherein the reformer and the catalyst combustor are disposed in the space between the first container and the second container.

* * * * *

UNITED STATES PATENT AND TRADEMARK OFFICE
CERTIFICATE OF CORRECTION

PATENT NO.         : 8,641,979 B2
APPLICATION NO.    : 12/333486
DATED              : February 4, 2014
INVENTOR(S)        : Motoki Endo et al.

It is certified that error appears in the above-identified patent and that said Letters Patent is hereby corrected as shown below:

On the Title page, Column 2, Item (56) References Cited, Line 7;

delete "translat on" and insert --translation--.

In the Specification

Column 4, Line 19;

delete "ziconia" and insert --zirconia--.

Column 5, Line 41;

delete "21," and insert --21.--.

Column 6, Line 67;

delete "Ra=g β pCp ΔTd/vk" insert --Ra=g β pCp ΔTd$^{3}$/vk--.

Column 9, Line 52;

delete "projector," and insert --projector.--.

Column 13, Line 55;

delete "10E," and insert --100E,--.

Column 14, Line 55;

delete "laA," and insert --1aA,--.

Column 14, Line 57;

delete "laA," and insert --laA,--.

Signed and Sealed this
Fourteenth Day of October, 2014

Michelle K. Lee
*Deputy Director of the United States Patent and Trademark Office*